(12) United States Patent
Mennes et al.

(10) Patent No.: US 8,302,167 B2
(45) Date of Patent: Oct. 30, 2012

(54) STRONG AUTHENTICATION TOKEN GENERATING ONE-TIME PASSWORDS AND SIGNATURES UPON SERVER CREDENTIAL VERIFICATION

(75) Inventors: Frederik Mennes, Brecht (BE); Frank Hoornaert, Bertem (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 1000 days.

(21) Appl. No.: 12/046,118

(22) Filed: Mar. 11, 2008

(65) Prior Publication Data
US 2009/0235339 A1 Sep. 17, 2009

(51) Int. Cl.
H04L 29/06 (2006.01)

(52) U.S. Cl. .......................................................... 726/5

(58) Field of Classification Search .................. 726/5, 9; 713/161, 169, 170, 180; 705/64, 75
See application file for complete search history.

(56) References Cited

U.S. PATENT DOCUMENTS

| 4,599,489 A | 7/1986 | Cargile |
| 4,609,777 A | 9/1986 | Cargile |
| 4,799,258 A | 1/1989 | Davies |
| 4,819,267 A | 4/1989 | Cargile et al. |
| 5,136,644 A | 8/1992 | Audebert et al. |
| 5,657,388 A | 8/1997 | Weiss |
| 5,668,876 A | 9/1997 | Falk et al. |
| 6,299,425 B1 | 10/2001 | Hirano et al. |
| 2001/0054148 A1 | 12/2001 | Hoornaert et al. |
| 2003/0212894 A1* | 11/2003 | Buck et al. .................. 713/184 |
| 2006/0129838 A1* | 6/2006 | Chen et al. .................. 713/186 |
| 2007/0088952 A1* | 4/2007 | Hewitt et al. ................ 713/171 |
| 2007/0133839 A1 | 6/2007 | Muller et al. |
| 2008/0301461 A1 | 12/2008 | Coulier et al. |

FOREIGN PATENT DOCUMENTS

| EP | 0 566 811 A1 | 10/1993 |
| EP | 1 211 841 A1 | 6/2002 |
| EP | 1 788 509 A1 | 5/2007 |
| EP | 1 802 155 A1 | 6/2007 |
| WO | WO 00/48064 A1 | 8/2000 |

OTHER PUBLICATIONS

"OCB: Background", retrieved Nov. 3, 2010: http://www.cs.ucdavis.edu-rogaway/ocb/ocb-faq.htm, 7 pgs.
"Block cipher modes of operation", retrieved Nov. 3, 2010: http://en.wikipedia.org/wiki/Block_cipher_mode_of_operatiion; 13 pgs.
Bruce Schneier, "Applied Cryptography, 2nd Edition, Protocols, Algorithms, and Source Code in C", ISBN 0-471-12845-7; John Wiley & Sons, Inc. Chapter 9, pp. 195-196 (1996).
U.S. Appl. No. 60/183,640, filed Feb. 18, 2000.

* cited by examiner

*Primary Examiner* — Ali Abyaneh
(74) *Attorney, Agent, or Firm* — RatnerPrestia

(57) ABSTRACT

The invention defines a strong authentication token that remedies a vulnerability to a certain type of social engineering attacks, by authenticating the server or messages purporting to come from the server prior to generating a one-time password or transaction signature; and, in the case of the generation of a transaction signature, signing not only transaction values but also transaction context information and, prior to generating said transaction signature, presenting said transaction values and transaction context information to the user for the user to review and approve using trustworthy output and input means. It furthermore offers this authentication and review functionality without sacrificing user convenience or cost efficiency, by judiciously coding the transaction data to be signed, thus reducing the transmission size of information that has to be exchanged over the token's trustworthy interfaces.

67 Claims, 13 Drawing Sheets

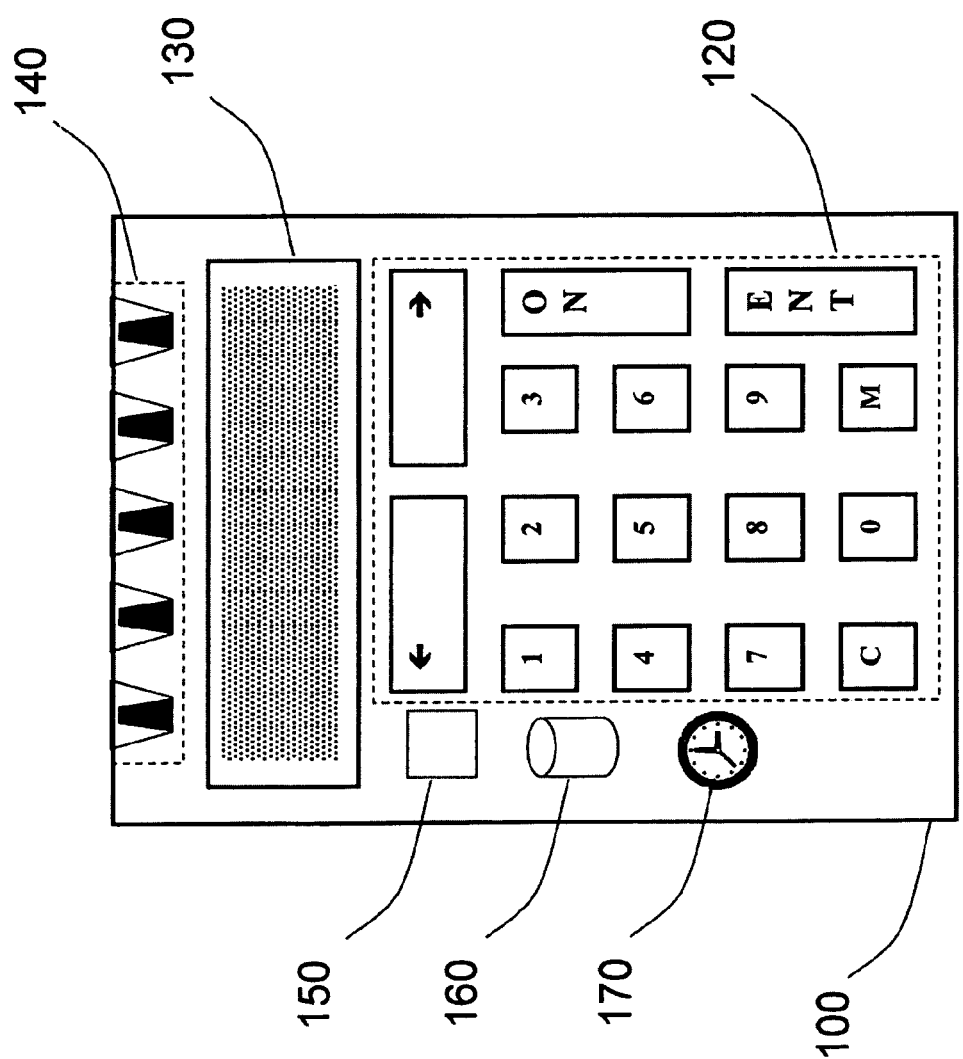

| | Cryptographic service | Cryptographic mechanism |
|---|---|---|
| 510 | Mutual authentication of the Authentication Server and the DP710 | |
| 511 | Authentication of the Authentication Server to the DP710 | Time-based OTP generated by the Authentication Server |
| 512 | Authentication of the DP710 to the Authentication Server | Challenge- and time-based OTP generated by the DP710 |
| 520 | Authentication of transaction data | |
| 521 | Authentication of transaction data transferred from the Authentication Server to the DP710 | Encryption of redundant information associated with transaction data by Authentication Server |
| 522 | Authentication of transaction data transferred from the user to the Authentication Server | Time-based electronic signature over the transaction data generated by the DP710 |
| 530 | Confidentiality of transaction data transferred from the Authentication Server to the DP710 | Encryption of transaction data by Authentication Server |
| 540 | Unlocking of PIN-locked DP710 | challenge/response PIN unlock algorithm |

Figure 5

STRONG AUTHENTICATION TOKEN GENERATING ONE-TIME PASSWORDS AND SIGNATURES UPON SERVER CREDENTIAL VERIFICATION

TECHNICAL FIELD

The invention relates to securing remote access to computers and applications and remote transactions over computer networks. More specifically, the invention relates to generating one-time passwords to authenticate users and transaction signatures to indicate transaction approval, upon verification of a server credential, using a separate device, not connected to a computer.

BACKGROUND ART

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

In the past, application providers have relied on static passwords to provide the security for remote applications. In recent years it has become evident that static passwords are not sufficient and that more advanced security technology is required.

One way of solving the security problems associated with remote access to computer systems and applications over public networks is provided by a Public Key Infrastructure (PKI). Using a Public Key Infrastructure one associates a public-private key pair with each user. The key pair is associated with a certificate (issued by a trustworthy Certificate Authority) that binds that public-private key pair to a specific user. By means of asymmetric cryptography this public-private key pair can be used to authenticate the user, sign transactions, and set-up encrypted communications.

To guarantee an adequate level of security it is mandatory that each user's private key remains secret and can only be accessed to create a signature or to decrypt a message by the legitimate user associated with that key. It is common to rely on a smart card or a dedicated Universal Serial Bus (USB) device (sometimes referred to as a USB key or a USB token) to store the public-private key pair and the certificate and to carry out the cryptographic calculations involving the private key.

There are some disadvantages associated with PKI and the smart cards carrying the PKI keys and certificates:
1. Building a Public Key Infrastructure is generally complicated and therefore expensive when compared to competing security technologies.
2. PKI is inherently limited to environments and applications where there is a digital connection between clients and servers, because PKI cryptograms and signatures are bulky and not easily transformed into human-readable form. In other words it is unsuitable for telephone banking or other delivery channels where it is not possible to provide a digital connection between the container of the PKI certificate and private key on the one hand and an application server on the other hand.
3. PKI smart cards and USB tokens do not have a built-in power supply or a user interface. PKI smart cards and USB tokens therefore rely on the presence of an interfacing system that provides electrical power to the card, that is capable of digitally exchanging data with the card, and that is capable of interacting with the user (e.g. capturing the card's PIN and presenting the data that should be signed). USB tokens are usually plugged into a built-in USB port of a PC, where the USB port supplies power to the USB token and the human interface devices connected to the PC provide the user interaction capabilities (connected USB token model). PKI smart cards are usually operated by means of a PC equipped with a simple smart card reader, where the reader only supplies power to the smart card and enables communication between an application on the PC and the inserted smart card, and whereby the human interface devices connected to the PC provide the user interaction capabilities. Such a reader, which has no trustworthy user interface of its own, is often referred to as transparent card reader. These typical usage models reduce the mobility of the user, as most PCs are not pre-equipped with smart card readers, and ad-hoc installation of drivers for the readers of USB tokens proves too cumbersome. It also presents a security problem: all user interaction (such as approving a signature or capturing the card's PIN) is done on the inherently insecure PC.

Another approach consists of adding software applications offering security functions to general purpose devices such as a user's PC, or mobile device (e.g., mobile phone or PDA). The main problem associated with this approach is that general purpose devices have an inherently open architecture which makes them susceptible to all kinds of malicious software such as viruses and Trojans that could present fake messages to the user or capture whatever the user enters on the keypad or read in memory sensitive data associated with a security application or alter data before they are being signed. Therefore general purpose devices can not be considered to have a trustworthy user interface and don't have secure means to store secrets such as PIN values and cryptographic keys. Furthermore, known solutions for mobile devices rely on wireless subscriber networks for the reception and/or transmission of transaction data. Such networks have inherent security and end point authentication mechanisms in place, which cannot be assured to be present when the Internet is used for all transmissions.

An alternative technology for authentication and transaction signature capabilities, which avoids the security issues of solutions based on general purpose devices and the security, installation and interconnection problems of PKI smart cards and USB tokens, is offered by 'strong authentication token devices'. Typical examples of strong authentication tokens are the products of the DIGIPASS® line, commercialized by Vasco Data Security Inc. (see the website http://www.vasco.com). A strong authentication token is an autonomous battery-powered device, dedicated to providing authentication and transaction signature functions, usually pocket-size, with its own display and keypad. In some cases the keypad is reduced to a single button or even completely omitted, in other cases the keypad can be a full keyboard. The display and keypad of a typical strong authentication token are non-removable and not user-serviceable, fully controlled by the token, and immune for interference by malicious software on a host computer. Therefore strong authentication tokens are considered to have a trustworthy user interface in contrast to e.g. PCs where there is always the possibility that malicious software such as a virus or a Trojan presents fake messages to the user, or captures whatever the user enters on the keypad, or reads in memory sensitive data associated with a security application or alters data before they are being signed. The main purpose of a strong authentication token is to generate dynamic security values which are usually referred to as 'One-Time Passwords' (OTPs). Typically these OTPs are generated by cryptographically combining a secret that is shared between the token and a verification server with a dynamic value such as a time value, a counter value or a server challenge that is provided to the token, or a combination of these. Same strong authentication tokens can also use data (such as transaction data) that have been provided to the token as dynamic value or in combination with any of the dynamic values mentioned above to generate a security value. In these cases the resulting security value is meant to indicate the user's approval of the data and the security value is usually referred to as an electronic signature or Message Authentication Code (MAC). Some strong authentication tokens consist of a device with a display and a keypad that is capable of communicating with an inserted smart card whereby the generation of the OTPs or MAOs is partly done by the device itself and partly by the inserted smart card.

A typical way to provide data to a strong authentication token is by letting the user enter the data manually on the token's keypad. When the amount of data that has to be entered in this way exceeds a few dozen characters, the process is often perceived by users as too cumbersome. To relieve the user, solutions have been devised whereby the input of data doesn't require the manual entry of said data by the user on the token's keypad. One example are solutions whereby the token comprises receiving means to receive data sent over an out-of-band channel such as for example a radio network or mobile telephony network (U.S. Pat. No. 5,668,876 Sep. 16, 1997). The disadvantage of such out-of-band solutions is the extra complexity and cost associated with supporting the technology of said out-of-band channel, and the dependence on the availability and the cost of usage of said out-of-band channel. Another solution consists of tokens that allow for data input by means of an optical interface, whereby the user holds the token close to a computer screen that displays a varying optical pattern. Examples of such optical tokens are Digipass 700 and Digipass 300 offered by Vasco Data Security, and the tokens described in EP 1211841 Jun. 5, 2002, EP 1788509 May 23, 2007, U.S. Pat. No. 5,136,644 Aug. 4, 1992.

The most common and practical mechanism to transfer the generated OTPs or MAOs to the servers or applications to be protected is by manual copying of said security values as presented by the token into the computer and transmitting them to the server or application using the same in-band channel as the other interaction between the user and the computer system or application being protected. Other solutions exist whereby security values are transferred using another out-of-band channel such as for example a radio network or mobile telephony network. The disadvantage of such out-of-band solutions is the extra complexity and cost associated with supporting the technology and usage of said out-of-band channel.

A general problem of tokens with an optical data input interface is that relatively expensive components are required to build an interface that can take in data at a high data rate. This is a consequence of the requirement to work reliably in a very broad range of computer screen qualities and environmental lighting conditions, combined with the relatively low refresh rates of typical computer screens. A more cost-effective alternative is to use a low-speed optical interface, limiting the transaction data that are effectively submitted to the token to a small number of values. For example, in the case of a money transfer the transaction data that is effectively being signed is often limited to just the amount value and the destination account number. These values are presented to the token without any contextual information regarding the type of transaction and the exact meaning of the transaction values, as the transaction type and the actual meaning of the transaction values is assumed to be known implicitly.

This lack of context information, in combination with the fact that the same tokens are sometimes used to secure very different types of applications and transactions, could be exploited in a specific kind of social engineering attack whereby the attackers convince legitimate users to sign with their token a sequence of values that the attackers present to the users as corresponding to an apparently legitimate and innocent transaction, after which the attackers submit in a completely different transaction or application type the same sequence of values and the signature fraudulently obtained from the legitimate users. For example, to protect money transfers, a bank might require users to sign with their token the values of the amount to be transferred and the account where the money should be sent to. An attacker who wants to fraudulently transfer money from victims' accounts to the attacker's account could circumvent this signature protection mechanism by tricking victims into signing with their token two innocent looking values that the attacker presents to them in such way that the victims don't associate the two values with an amount and an account number for a money transfer. The attacker might for example invite the victims to participate in a kind of lottery where they supposedly can win some exotic trip. The only thing they need to do to have a chance of winning is to generate and submit a lucky number by signing a date of departure e.g. Dec. 20, 2008 represented as, 12-20-08, and a participant reference number e.g. 1234-5678-9002. The victims end up signing the values '122008' and '123456789002' where after the attacker submits to the bank the fraudulent money transfer of 1220.08 dollar to the account 123-4567890-02. The bank accepts this transaction since the attacker can submit a valid token signature oh the values '122008' and '123456789002' corresponding to the fraudulent transaction.

Another problem with the current generation of strong authentication tokens is that they will generate OTPs on the simple request of the user. This makes it possible for attackers to lure unsuspecting users by means of false pretexts into generating and handing over valid OTPs which can then be used by the attackers to successfully authenticate to an on-line application.

DISCLOSURE OF INVENTION

The present invention is based on the insight that dedicated strong authentication tokens offer a highly secure and versatile solution to protect remote access to computer systems and applications, if they provide a solution against the social engineering attacks described above. It is further based on the insight that the strong authentication token's vulnerability to social engineering attacks can be remedied by authenticating the server or messages purporting to come from the server prior to generating a one-time password or transaction signature; and, in the case of the generation of a transaction signature, signing not only transaction values but also transaction context information and, prior to generating said transaction signature, presenting said transaction values and transaction context information to the user for the user to review and approve using trustworthy output and input means. It is furthermore also based on the insight that such authentication and review is possible without sacrificing user convenience or cost efficiency, by judiciously coding the transaction data to be signed, thus reducing the transmission size of information that has to be exchanged over the token's trustworthy interfaces.

It is an object of this invention to provide a method and device (or token) to:
1. generate one-time passwords and transaction signatures only on the request of a legitimate application server,
2. allow the user to review and sign transaction data including transaction values and context information on a secure device with a trustworthy user interface,
3. whereby all data exchange between the device and a server can happen in a way that is convenient for the user and can happen via virtually any client computer that is equipped with a keyboard and display, without requiring any hardware or driver installation on the client computer.

This application discloses a low-cost strong authentication token for creating one-time passwords and/or transaction signatures, hereafter collectively referred to as security values, for use in client-server transactions, comprising trustworthy output means to present information to the user, and data input means capable of receiving input data, whereby the input data is efficiently encoded so as to allow transfer of the input data into the token in a reasonable time frame and requiring only low-cost hardware, and whereby said token generates a security value upon verification of a server credential. Said security value is generated using a secret shared between token and server, and said server credential is generated and verified using another (optionally, the same) secret shared between token and server.

In a preferred embodiment the input data is input to the token by means of an optical interface. In other embodiments the token may have other data input mechanisms to receive input data. Said other data input mechanisms can include alternative mechanisms to manually enter data such as joysticks, jog dials, track balls, or similar devices, or can include communication mechanisms and protocols such as electrical personal area networks such as USB or Firewire, or acoustic connections, or wireless personal area networks using radio transmission such as Bluetooth or infrared transmission such as IRDA (Infrared data association).

In one set of embodiments of the invention the token includes a keypad. In one embodiment this keypad allows entry of at least the decimal digits. In another embodiment said keypad also allows entry of hexadecimal digits or alphanumerical characters. In some embodiments said keypad includes control buttons to indicate user approval or rejection of information or options presented by the token, or navigation buttons to navigate through menu options or through information presented by the token. In other embodiments said keypad comprises a full keyboard. In some embodiments, both a keypad and an optical interface may be present, where the keypad could serve as a back-up input means in case the optical input means fails.

In some embodiments of the invention the token's trustworthy output means include a display such as for example a Liquid Crystal Display (LCD) and/or one or more Light Emitting Diodes (LEDs) for example to indicate certain security statuses or conditions. In one embodiment the token can display texts on the display. In an embodiment said texts can be displayed as a sequence of characters. On another embodiment the token can display icons or pictograms on the display. In some other embodiment the token's trustworthy output means include audio output means such as for example a loudspeaker, earphones, or means to attach such loudspeaker or headphones such as for example a ⅛" audio socket or an ROA audio socket, to convey information to the user by means of generated sounds. In one embodiment the generated sounds are sequences of tones. In another embodiment the generated sounds consist of synthesized speech. In another embodiment the generated sounds are reproductions of stored sound fragments.

In a preferred embodiment of the invention the token includes means such as a microprocessor to perform cryptographic operations as RAM, ROM or EEPROM memory to store one or more secret values such as one or more PIN values or cryptographic secret keys.

In one embodiment of the invention the input data can include a challenge. In another embodiment of the invention the input data includes transaction related data including transaction values or transaction context information.

In one embodiment of the invention the verification of the server credential is performed to authenticate the server. The server cryptographically generates a server credential that can be cryptographically verified by the token. In one embodiment said server credential is a one-time password generated using at least a symmetric cryptographic algorithm, and a secret Server Authentication Key shared between the token and the server, and a dynamic variable. Examples of such a symmetric cryptographic algorithm include symmetric encryption and decryption algorithms (for example DES, AES, Blowfish, IDEA, or Twofish), or symmetric Message Authentication Code (MAC) generating algorithms; or keyed hashing algorithms such as HVAC or based on hashing algorithms (for example MD5, SHA-1, SHA-256, or other known hashing algorithms) and including a shared secret key. In some embodiments said dynamic value can include a time value and/or a counter value.

The token will only generate a one-time password on condition that the token has successfully authenticated the server. In one embodiment the token's generating of the one-time password is cryptographically linked to the token's verifying of the server credential. In an embodiment the token includes in the generation of a one-time password data that is related to the verification of a server credential. In one embodiment the token includes in the generation of a one-time password data obtained while verifying a server credential. In one embodiment the server credential includes a server generated one-time password and the token generates a one-time password using said server generated one-time password as a challenge.

In one set of embodiments of the invention the token is capable of generating electronic signatures on transaction related data. In some embodiments a Server Initiated Signature (SIS) message containing transaction related data to be signed, after being received by the token, is authenticated such that the token can detect and reject SIS messages that don't originate from a legitimate server. In some embodiments the transaction related data to be signed contained in a SIS message are cryptographically combined by a legitimate server with a secret Data Transport Key (DTK) that is shared between said legitimate server and the token. In one embodiment the server generates a MAC on a version of the transaction related data to be signed and includes this MAC with a formatted version of the transaction related data to be signed into a SIS message. Upon receiving this SIS message the token authenticates this message by generating its own verification copy of the MAC with its own copy of the DTK and comparing said verification copy of the MAC with the MAC included in the received message. In another embodiment the server uses the DTK to encrypt a version of the transaction related data to be signed and includes the encrypted transaction related data into a SIS message. In one embodiment the version of the transaction related data to be signed that is encrypted with a DTK contains some level of redundancy. Upon receiving a SIS message containing encrypted transaction related data, the token decrypts the encrypted transaction related data, thus implicitly authenticating the received transaction related data to be signed if said decrypted data including the redundancy is coherent and structurally correct. In one embodiment the method to encrypt the transaction related data to be signed uses a symmetric encryption algorithm in a mode in which the cipher text is not longer than the clear text such as for example 3DES or AES in Cipher-Block Chaining (CBC) mode with Cipher Text Stealing (CTS) (SCHNEIER, BRUCE. Applied Cryptography. 2nd edition. John Wiley, 1996. ISBN 0471117099. p. 195.). In another embodiment the method to encrypt the transaction related data to be signed uses an authenticated-encryption scheme for example using a block cipher in OCB mode (http://en.wikipedia.org/wiki/Authenticated_encryption, and http://www.cs.ucdavis.edu/~rogaway/ocb/ocb-faq.htm, accessed on 2008-03-05).

In one embodiment said Data Transport Key (DTK) is a secret key that is shared between the server and the Token. In another embodiment the DTK is a secret session key that is dynamically generated by both the server and the Token and that has a limited lifetime. In an embodiment one of the factors determining the lifetime of the DTK is the time that has passed since the generation of the DTK value. In another embodiment one of the factors determining the lifetime of the DTK is the number of times that the DTK has been used since the generation of the DTK value. In an embodiment the DTK is diversified from a master secret shared between the server and the Token and diversification data. In one embodiment said diversification data includes a counter. In another embodiment said diversification data includes a time value. In yet another embodiment said diversification data includes a random nonce. In yet another embodiment said diversification data includes a challenge. In another embodiment the DTK is generated using information or data obtained during the generation or verification of a one-time password and/or a server credential.

In some embodiments said SIS message includes a varying element to prevent replay attacks. In one embodiment said varying element includes a counter value. In another embodiment said varying element includes a time value. In yet another embodiment said varying element includes a cryptogram generated using a session key with a limited life-time.

In some embodiments the transaction related data elements to be signed in said SIS message are compressed so as to limit the size of said SIS message. Upon receiving the SIS message, the token expands the compressed transaction related data included in the received message before presenting said transaction related data to the user for approval. Different compression methods can be applied:

Instead of containing only literal texts or values, the message can also contain references to texts or values known to or stored in the token. For example, the message can contain a tag value that refers to the text "Amount=", rather than containing the full literal "Amount=" text itself. The message can also contain a reference to a stored value of the user's default account number, rather than containing the literal user's account number itself.

Formatted numerical data such as money amounts or account numbers are represented as raw non-formatted numerical data whereby the formatting is added during the expansion based on explicit formatting indicators or implicit context information that implies a certain format.

Meaningful units of data that tend to have a fixed structure can be coded into a tagged data structure whereby the tag value implicitly indicates the structure to be applied and the meaning and formatting of the data included in or referred to by the data structure. For example the data corresponding to a money transfer can be packed into a money transfer data structure whereby said money transfer data structure only explicitly contains the money transfer data structure tag, a numerical value <am_val> indicating the amount of money, a currency indicator <curr_code>, a numerical value <acc_from> indicating the account from which to withdraw the money, and a numerical value <acc_to> indicating the account to which to transfer the money. The value of the money transfer data structure tag automatically implies that this data structure shall be expanded into a text such as for example "Transaction type=money transfer; Amount of money to transfer=<am_val> <curr_code>; Account from which to withdraw=<acc_from>; Account to which to transfer is=<acc_to>", whereby it is implicitly known from the money transfer data structure tag value that <am_val> shall be formatted as an amount of money (e.g. xxx,xxx.xx), <curr_code> as a currency code (e.g. USD or EUR or YEN); and <acc_from> and <acc_to> as account numbers (e.g. 123-4567890-02 or 1234-4567-8901-2345).

Numerical values are coded using a coding technique specific for numerical values such as Binary Coded Decimal (BCD) or a straightforward binary representation of integer numbers, rather than as a string of alphanumerical characters.

Only a limited set of alphanumerical characters is supported. This allows to code characters using fewer bits per character.

In one embodiment the token creates a signature using a compressed version of the transaction related data to be signed. In another embodiment the token creates a signature using an expanded version of the compressed transaction related data to be signed.

In some embodiments the token presents at least part of the transaction related data to be signed to the user and the user must approve the presented transaction related data, before the token generates the signature on the transaction related data. In one embodiment the user indicates approval explicitly e.g. by pressing an OK button or by entering a PIN value. In another embodiment the user indicates approval implicitly by not explicitly indicating refusal e.g. by pressing a cancel button within a certain time-out.

In some embodiments the token is capable of receiving and acting upon configuration and/or management instructions. Examples of configuration and/or management instructions include instructions to enable or disable token functionality, instructions for key management such as key roll-over, instructions to manage stored data e.g. instructions to add or replace stored texts or messages or account numbers that can be referenced in e.g. a Server Initiated Signature message, instructions to manage the user identity verification mechanism e.g. to unblock a blocked PIN or to set a new PIN value, to reset a try counter, or to erase or reset a reference value such as a finger print reference template. In one embodiment these instructions can be embedded in configuration and/or management messages. In another embodiment these instructions can be included in authentication or signature messages such as a Server Initiated Signature message. In yet another embodiment messages containing configuration and/or management instructions are authenticated.

It may be advantageous that certain functions of the token are protected by a user identity verification mechanism. This user identity verification mechanism could for example include verification of a fingerprint or another biometric reading. Alternatively this user identity verification mechanism could include verification of a Personal Identification Number (PIN).

In another set of embodiments the token also comprises means to access a removable security device capable of cryptographic operations and/or storing one or more secret values. Examples of such a removable security device include a smart card or a subscriber identity module (SM) card or a USB token. In one embodiment the token is an unconnected battery-powered smart card reader and said means to access said removable security device comprises a smart card connector and said removable security device is a smart card inserted in said unconnected smart card reader.

In one particular set of embodiments the role of the removable security device is limited to be a secure storage means for secrets used by the token. In another particular set of embodiments the removable security device performs cryptographic functions such as for example encryption, decryption or keyed hashing. In a typical embodiment the token verifies the authenticity of messages or data received from a server, while the removable security device is capable of generating cryptograms using a secret shared between the server and the removable security device. Said cryptograms are typically generated by said removable security device using data such as a challenge or transaction data received from the token and/or using a counter that is maintained by said removable security device. In one embodiment the token transforms cryptograms generated by said removable security device into one-time passwords or signatures to be transferred by the user to the server. In another embodiment the token uses a cryptogram generated by said removable security device to generate a session key. In one embodiment said session key is used by the token to verify and/or decrypt messages or data received from a server. In another embodiment said session key is used by the token to sign transaction data that the token received from the server and has submitted to the user for review and approval. In another embodiment the token submits messages or data received from a server to said removable security device to verify the authenticity of said messages or data, and the token informs the user if said verification failed. In one embodiment the token has means such as a keypad to capture a PIN value and is capable of submitting said PIN value to said removable security device for verification.

It may also be advantageous that the token can support multiple languages. I.e. the token's output to the user can happen in more than one language. In one implementation the token could support a menu function which allows the user to select the language to be used from a list of supported languages. In another implementation the language could be indicated in a message that is received by the token. In yet another implementation the language could be indicated by a data element stored on a secondary storage device that can be accessed by the token. In one implementation this secondary device may be a smart card.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 1a schematically illustrates a typical implementation of the invention.

FIG. 5 summarizes the cryptographic security services offered by a preferred embodiment of the invention and the cryptographic mechanisms used by said preferred embodiment of the invention to provide these security services

DETAILED DESCRIPTION OF THE INVENTION

Figure 1B:
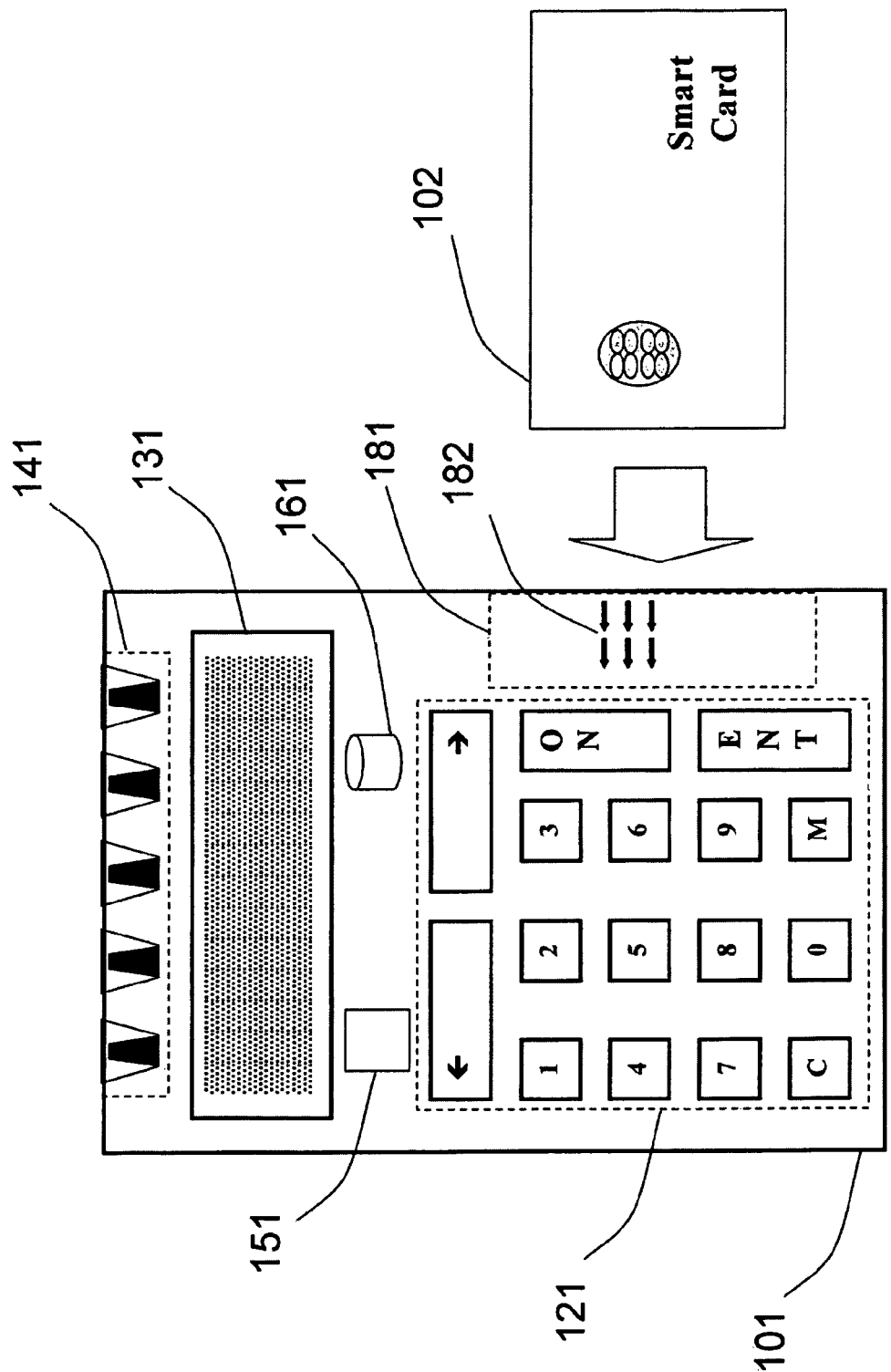
FIG. 1b schematically illustrates another typical implementation of the invention, capable of communicating with a removable security device.

Some implementations of the present invention are discussed below. While specific implementations are discussed, it should be understood that this is done for illustration purposes only. A person skilled in the relevant art will recognize that other components and configurations may be used without parting from the spirit and scope of the invention.

FIG. 1a schematically illustrates a typical implementation of the invention consisting of a token (100) for generating security values such as one-time passwords to authenticate a user or transaction signatures to indicate the user's approval of a transaction, comprising:

trustworthy means (130), such as for example a display or audio output means, to communicate information, such as said security values or transaction data to be approved, to the user;

a data input interface, such as a keypad (120) and/or an array of photosensitive elements (140), for receiving server credential information and/or to capture the user's approval of transaction data;

processing means (150) such as a microprocessor capable of cryptographic operations, for verifying server credentials and for generating security values upon said server credential verification, using secrets shared with a server;

storage means (160), such as a ROM, EEPROM, or battery-backed RAM, for storing secrets or data constants to expand server messages containing transaction related information such as values and context information, formatted according to a compact encoding scheme which includes the usage of references to said data constants;

a clock (170) to provide a time value that can be used in the verification of a server credential or in the generation of a security value.

FIG. 1b schematically illustrates another typical implementation of the invention consisting of a first security device (101) for generating security values such as one-time passwords or transaction signatures to indicate the user's approval of a transaction, and capable of communicating with a removable second security device (102), such as for example a smart card, to which for example some cryptographic operations can be delegated, comprising:

- trustworthy means (131), such as for example a display or audio output means, to communicate information, such as said security values or transaction data to be approved, to the user;
- a data input interface, such as a keypad (121) or an array of photosensitive elements (141), for receiving server credential information;
- processing means (151) such as a microprocessor;
- storage means (161), such as a ROM, EEPROM, or battery-backed RAM, for storing data constants to expand server messages containing transaction related information such as values and context information, formatted according to a compact encoding scheme which includes the usage of references to said data constants;
- an interface (181), comprising for example a smart card connector (182), to interact with a removable security device (102).

A preferred implementation of the present invention, hereinafter referred to as the token (100), is discussed in detail below.

Hardware

Figure 1C:
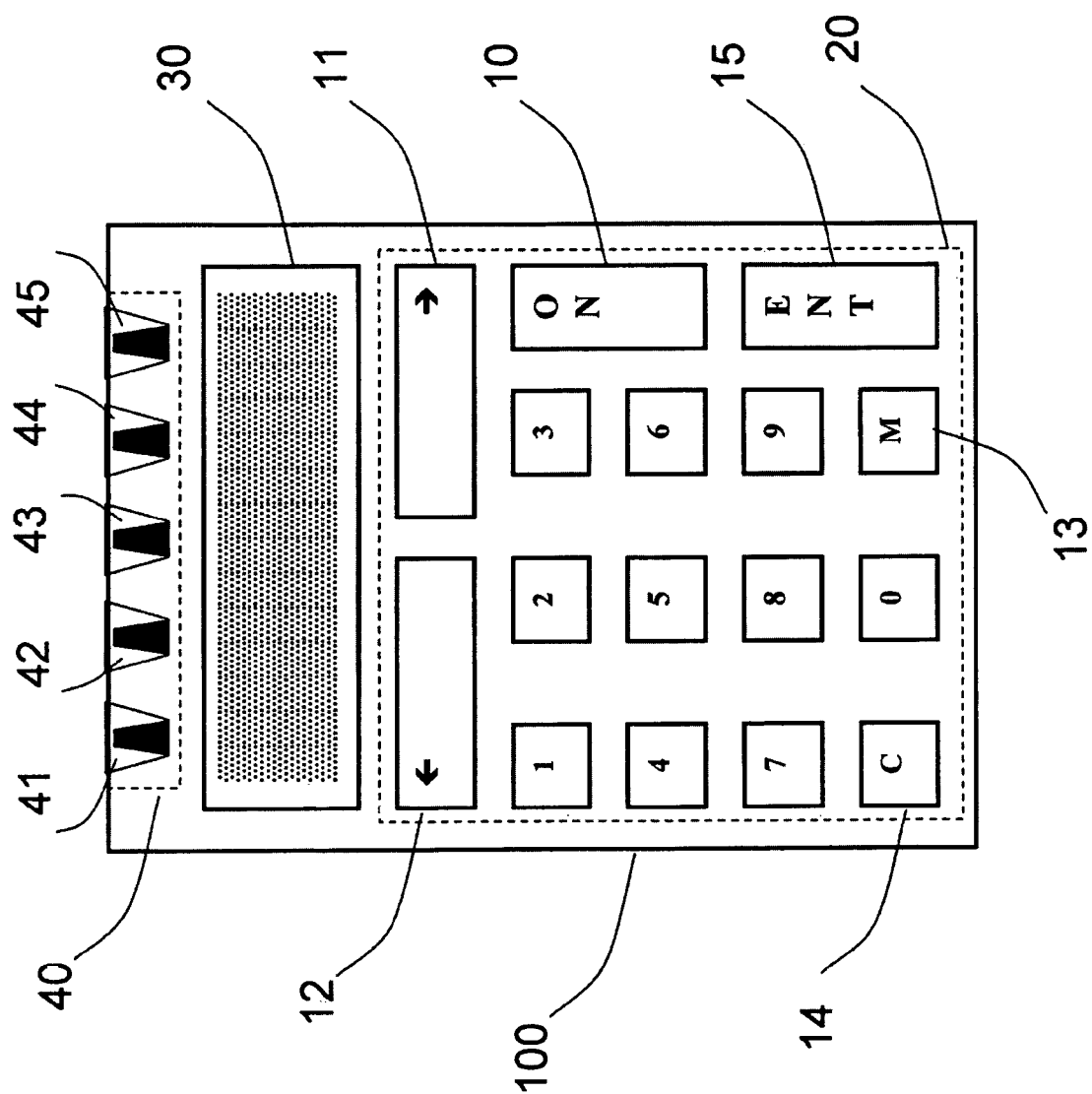
FIG. 1c shows a schematic drawing of a strong authentication token implementing the present invention.

FIG. 1c shows a schematic drawing of a hardware strong authentication token (100) with a trustworthy user interface consisting of a display 30 and a keypad 20. The keypad 20 includes:

1. ten decimal digit buttons 0 to 9 to enter data,
2. an on/off button 10 to switch the token (100) on or off,
3. two arrow buttons 11 and 12 to navigate through data being displayed, which can be the data to be signed or other information that is shown,
4. a menu button 13 to cycle through the list of available MENU functions,
5. a cancel button 14 to cancel a choice, to correct data during input or to escape from a selected function,
6. and an enter button 15 to confirm a choice, to approve transaction data to be signed being presented to the user by the token (100), to conclude the manual input of data, or to confirm that an error message has been observed.

The token (100) also has an optical interface 40 for data input via the user's computer screen. The optical data input interface 40 consists of five phototransistors 41 to 45. It will be apparent to someone skilled in the art that in other embodiments other types of photosensitive components can be used, that another number of photosensitive elements can be used, and that various physical arrangements of the photosensitive elements on the token can be used.

Functionality

Depending on the configuration, some functions are PIN-protected. The PIN is a secret decimal number that is only known to the legitimate user of the token (100). Before the token (100) allows the user to use the PIN-protected functions, the token (100) will authenticate the user by verifying this PIN. In a typical configuration a new token (100) is delivered to the user pre-programmed with a random initial PIN value that has to be changed by the user upon first usage. The user receives this initial PIN value from the issuer organization in a secure way (e.g. in a sealed envelope).

The token (100) offers a function that allows the user to change the PIN value. The PIN change process has to respect a minimum and maximum PIN length and in addition the new PIN may not be week (i.e. should not be easy to guess such as a PIN value having all identical digits).

Figure 2:
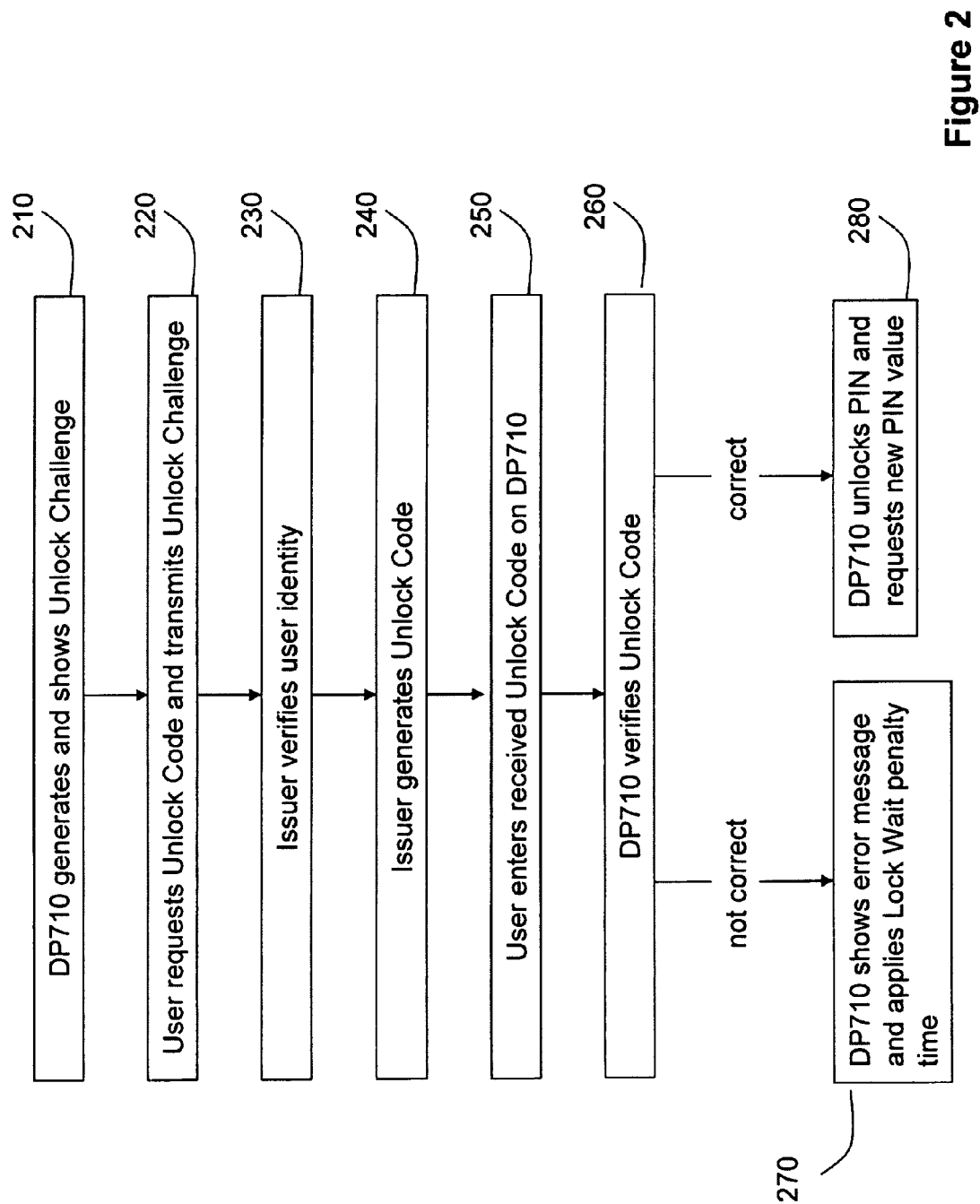
FIG. 2 illustrates the main steps in a PIN Unlock procedure of a preferred embodiment of the invention.

If the PIN is locked, the token (100) shows a warning message, informing the user that the PIN is locked. This message disappears after a short time or when the user presses the Enter button on the keypad. In that case the PIN Unlock function can be used to unlock the PIN. FIG. 2 summarizes the different steps in unlocking a locked PIN:

1. The token (100) calculates and shows an Unlock Challenge (step 210). The Unlock Challenge is 7 digits long, whereby the last digit is a check digit. This check digit allows the issuer organization to verify if the user has correctly copied the Unlock Challenge.
2. The user contacts the issuer organization, transmits the displayed Unlock Challenge and requests an Unlock Code (step 220).
3. The issuer verifies the identity of the user, for example by asking a number of questions that only the legitimate user is assumed to be able to answer correctly (step 230).
4. After successful user identity verification, the issuer generates the Unlock Code that corresponds to the given Unlock Challenge and communicates this Unlock Code to the user (step 240). The Unlock Code is 8 digits long to avoid unlocking by trial and error and to avoid confusion with other decimal numbers used.
5. The token (100) requests the user to enter the Unlock Code. The user enters the Unlock Code received from the issuer organization in the device (step 250).
6. The token (100) verifies the Unlock Code entered by the user (step 260).
7. If the Unlock Code is wrong, the token (100) will show an error message. In order to limit exhaustive search, a Pin LockWait time penalty will be used that exponentially increases with the amount of errors (step 270). The duration of the first PIN LockWait penalty period can be configured (1 to 5 minutes). During the PIN LockWait penalty period, a message is shown to the user and an indication is shown expressing the amount of time the user has to wait. The token (100) will not allow normal operation until a correct Unlock Code is presented. The token (100) maintains the PIN LockWait penalty even when it has been switched off.
8. If the Unlock Code is correct, the token (100) will clear the counter of failed PIN entry attempts and consider User Authentication to the token (100) to be successful. Because the PIN locking is due to repeated PIN errors, the holder will be immediately asked to replace the unlocked PIN by a different, new PIN value (step 280). If the PIN Change is successfully completed the user can use the new PIN value. If the PIN Change is not completed (e.g. by switching off the token (100)), the token (100) will continue to expect the original PIN value that was previously locked.

After a successful User Authentication to the token (100), the token is ready for operation. The user can either generate Passwords and Signatures or go through the Function Menu of the token (100).

Figure 3:
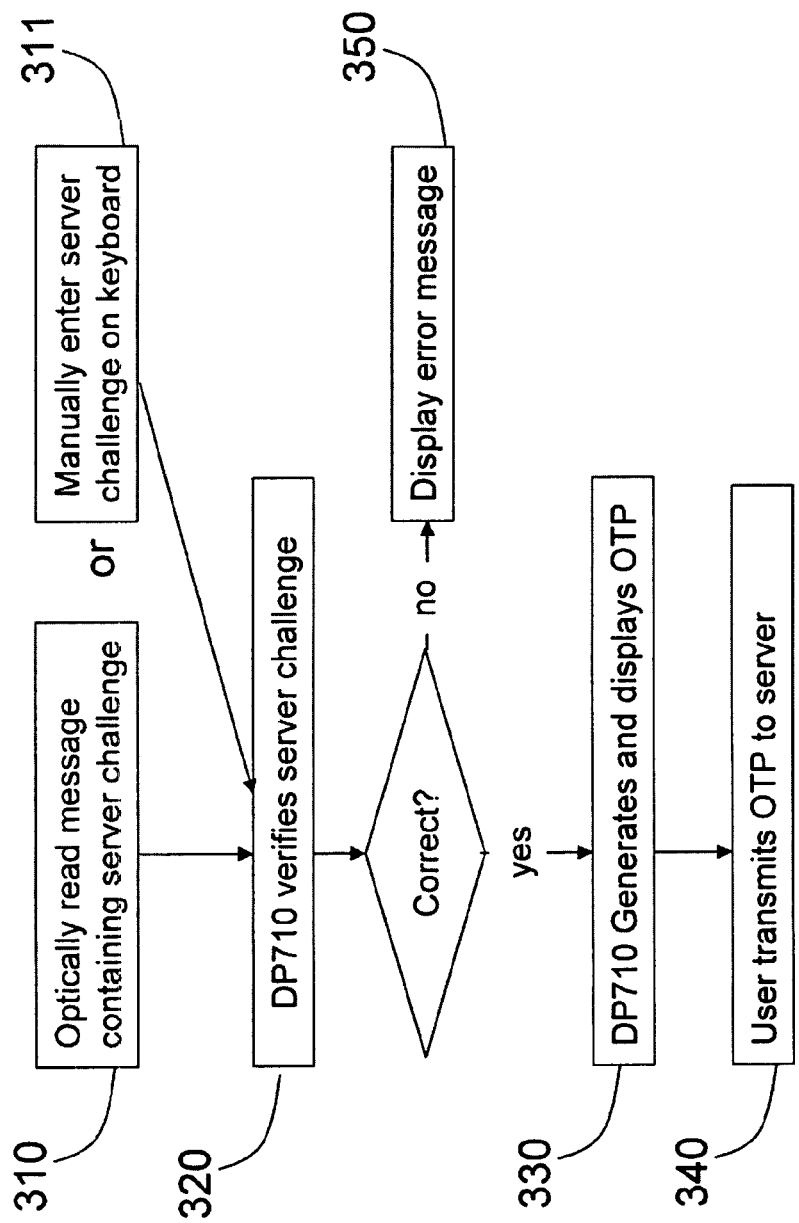
FIG. 3 illustrates the main steps of a preferred embodiment of the invention generating a one-time password upon successful verification of a server credential.

After correctly entering the PIN code in the token (100), the device becomes ready to do a cryptographic operation such as for example the Mutual Authentication. This can be indicated to the user by a "READY" message. FIG. 3 summarizes the main steps of the Mutual Authentication process.

1. Typically, the user uses the token (100)'s optical interface to read into the token (100) an optical message received from the server instructing the token (100) to start a Mutual Authentication and containing a server challenge (step 310). As back-up solution, the user can also manually enter the digits of the server challenge on the keypad of the token (100) (step 311).

2. The token (100) verifies the server's challenge (step 320).
3. If the token (100) has verified that the server challenge is correct, then the token (100) will compute and display an OTP (step 330) that needs to be copied by the user into the internet application (step 340).
4. If the challenge fails and is rejected, then the token (100), will show a message indicating that server authentication failed. This can for instance be the message "REJECTED" (step 350). This effectively means that the user will not be able to generate a token (100) OTP without getting a request to do this from the Server. This feature is called "Server Initiated Authentication", and it protects the user against giving valid OTP values to any screen that pops up on his computer screen and asks for the OTP.

The starting condition of the Transaction Signature function is similar to the starting condition of the Server Initiated Authentication function, but an extra constraint is added. This extra constraint is that the token (100) must have been used recently in a successful Server Initiated Authentication session or Transaction Signature session. This time period can be configured, a typical value being 2 hours. If a signature is requested outside this time limit, an error message is displayed.

Figure 4:
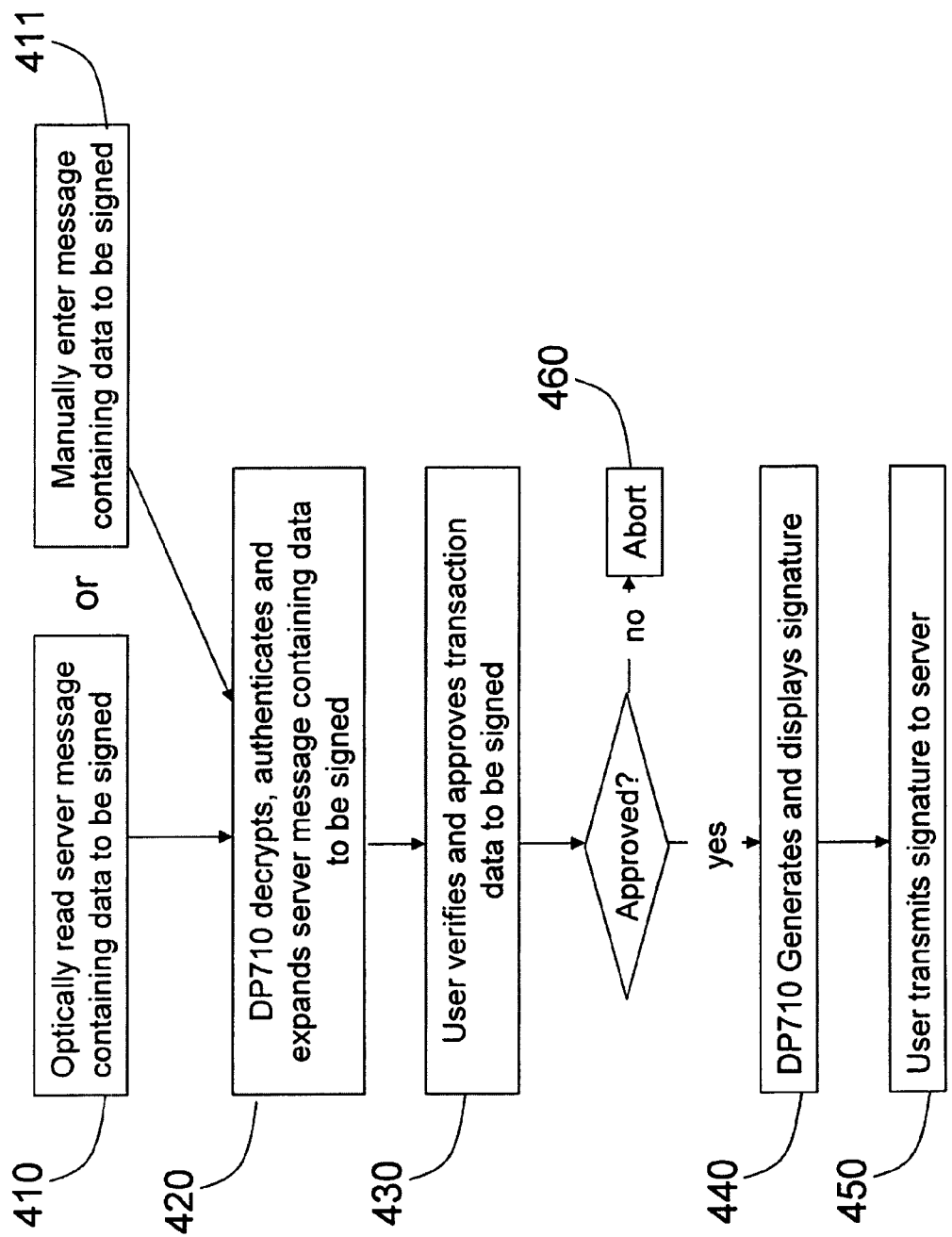
FIG. 4 illustrates the main steps of a transaction signature function of a preferred embodiment of the invention.

FIG. 4 summarizes the main steps of the Transaction Signature function:

1. In normal circumstances the user uses the optical interface to input into the token (100) a server message which contains in a compressed format the transaction data and transaction context information that must be signed and which has been encrypted and sent by the server to the user's computer (step 410). This server message contains a command indicator instructing the token (100) to start a Signature generation. As Back-up solution, the user can also manually enter the digits of this server message on the token (100) keypad (step 411).
2. The token (100) decrypts the received encrypted server message, verifies the authenticity and expands the compressed contents of the message (step 420). Thanks to the usage of field and message tags, this expanded content can be much longer than the number of digits being typed over or optically transmitted.
3. This expanded message content is now shown to the user for verification (step 430). The token (100) presents the different fields of the message to be signed on the token (100) display. The top line shows the text or message of the field, and the bottom line shows the value for that field. The user can now scroll through the different fields of the message using the left (previous field) and right (next field) arrows. If a text of a field or a value of a field does not fit the screen width, then after a short timeout, the top or bottom line will start scrolling slowly to the left. When the user has reviewed all the data to be signed, the token (100) suggests the user to either press Enter to accept the message, or to press Cancel to refuse the message.
4. If the user presses Enter, then the token (100) will generate the Signature and show it on the token (100) display (step 440) so that the user can copy the Signature value into the internet session with the server (step 450).
5. If the user presses Cancel, then the signature application is aborted and no signature is generated (step 460).

FIG. 5 summarizes the cryptographic security services offered by the token (100) and the cryptographic mechanisms used by the token (100) to provide these security services. The following keys are used in the context of these cryptographic services and mechanisms:

1. Server Authentication Key (SAK): used in the computation of the authenticated server challenge in the server authentication service 511.
2. Token Authentication Key (TAK): used in the computation of the OTP in the client authentication service 512.
3. Data Transport Key (DTK): used for encryption in the context of service 521 (authentication of the data to be signed when sent from the server to the token (100)) and service 530 (confidentiality of the transaction data to be signed when sent from the server to the token (100)).
4. Transaction Signing Key (TSK): used in the computation of the data signature in service 522 (authentication of the transaction data submitted by the user to the server).
5. Unlock Key (UNK): used in the computation of the Unlock Response in the Unlock PIN service 540.

Said cryptographic keys have following properties:
all keys are 128-bit 3DES secret keys
all keys are shared between the server and the token (100)
preferably, there is no inherent relation between the different keys of the same token
preferably, there is no inherent relation between the different keys of different tokens At the server-side, each key, except the Data Transport Key (DTK), is stored together with token application-specific data, for example in a database, preferably in encrypted form. In the token (100), each key is stored (or composed) in RAM. In other embodiments the cryptographic secrets can be stored using alternative memory technologies such as for example ROM, flash, EEPROM, hard disk. In other embodiments there may be relations between the different keys, e.g. to simplify key management. For example, some keys with different functions on the same token could have the same value or can be derived from a common master key and different diversifiers. Also, keys on different tokens but with the same function could be derived from a common master secret and the token's serial number.

Figure 6:
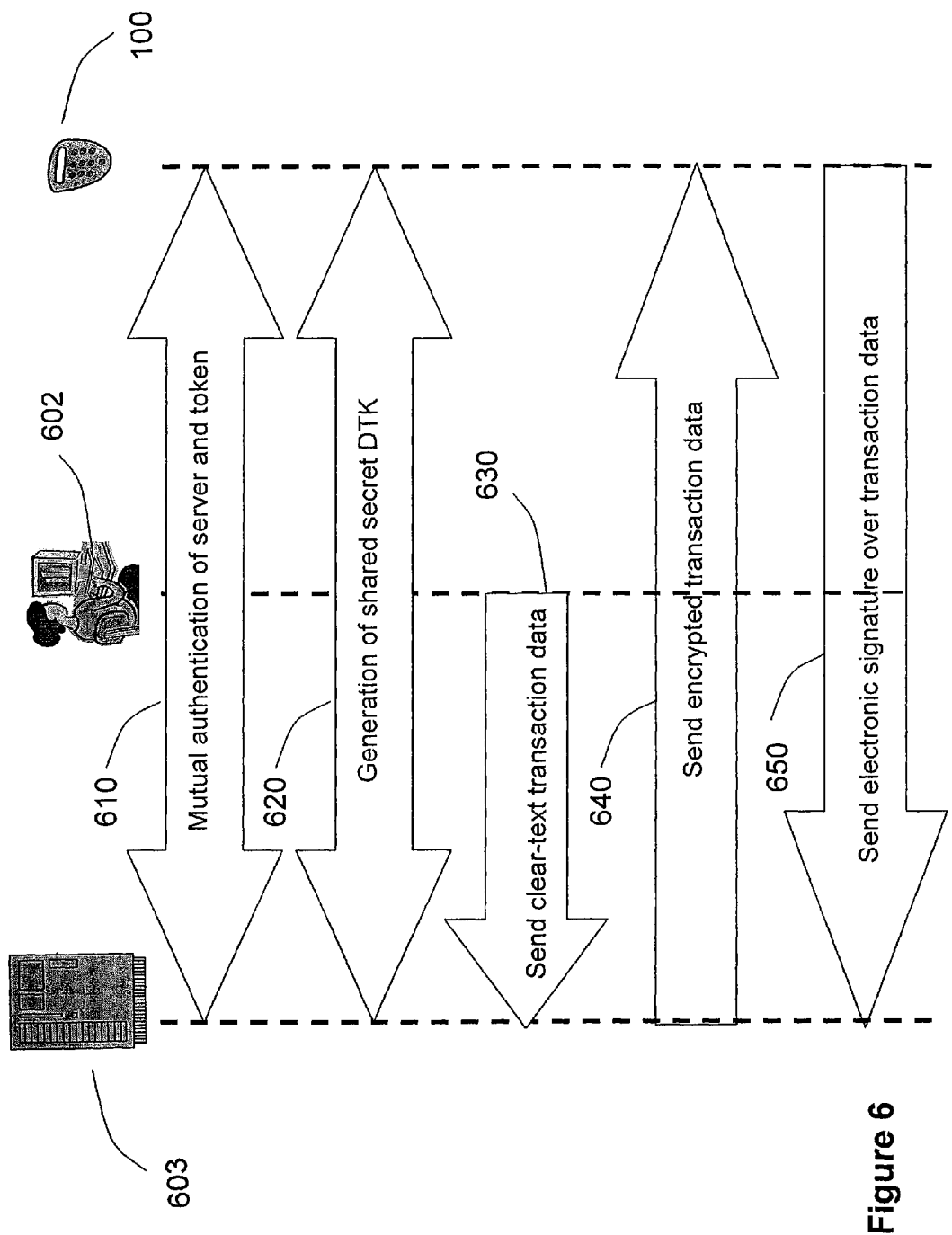
FIG. 6 illustrates a typical way of using said preferred embodiment of the invention in a mutual authentication and transaction signature process.

FIG. 6 provides a high-level overview of a typical way of using the token (100) in a mutual authentication and transaction signature process.

Step 610 consists of Mutual authentication of Authentication Server 603 and token (100). In this step, following actions are performed:

First, the Authentication Server 603 generates the Master Server OTP. The Master Server OTP is a time- and challenge-based one-time password computed using the Server Authentication Key (SAK) as key and the "Business Unit Index" (BUI) as challenge. The BUI is a value chosen from a limited list of values that indicate a business unit. The Master Server OTP has a length of 16 digits. Subsequently, the Master Server OTP is split into a Server OTP having 8 digits and a Server DTK Seed having 8 digits. The Authentication Server 603 keeps the Server DTK Seed secret, but sends the Server OTP to the token (100) for verification.

The token (100) receives the Server OTP from the Server 603. Upon successful verification of said received Server OTP, the token (100) has successfully authenticated the Authentication Server and identified the Business Unit, the token (100) uses the Server OTP and the Server Authentication Key (SAK) to compute the Server DTK Seed. By combining the received Server OTP with the calculated Server DTK Seed, the token (100) reconstructs the Master Server OTP.

Subsequently, the token (100) generates the Master Token OTP. This is a time- and challenge-based one-time password computed with the Token Authentication Key (TAK) as key and the Master Server OTP as challenge. It has a length of 20 digits. Subsequently, the Master Token OTP is split into the Token OTP (6 digits) and the Token DTK Seed (14 digits). The token (100) keeps the Token DTK Seed secret and shows the value of the Token OTP on its display to the user. The user reads the Token OTP from the display of the token (100) and sends it via the user's computer 602 to the Authentication Server 603 for verification.

Upon successful authentication of the token (100), the Authentication Server 603 uses the Master Token OTP and the Token Authentication Key (TAK) to compute the Token DTK Seed.

Because the Authentication Server is authenticated by the token (100) before the token (100) is authenticated by the Authentication Server, a rogue server is prevented from asking the token (100) for a correct Token OTP.

Step 620 consists of the generation of the Data Transport Key (DTK) as shared secret. In step 620, the Authentication Server 603 and token (100) generate a shared secret, called the Data Transport Key (DTK) using the Master Server OTP and Master Token OTP which were computed in Step 610.

Step 630 consists of transfer of clear text transaction data to the Authentication Server 603 by the user. In this step, the user e.g. enters financial transaction data onto his computer 602 and sends them to the Authentication Server 603.

Step 640 consists of transfer of encrypted transaction data from the Authentication Server 603 to the token (100). In this step, the Authentication Server 603 determines which parts of the transaction data and transaction context information have to be signed electronically, and formats/compresses the required parts. Subsequently, it encrypts the formatted transaction data using the Data Transport Key (DTK) derived in Step 620. The encryption is meant to ensure data authenticity as well as data confidentiality. More specifically, the transaction data is encrypted to allow the token (100) to verify whether the transaction data indeed originates from the Authentication Server 603, rather than from a rogue server. Next, the Authentication Server 603 sends the encrypted data to the user's computer 602. Subsequently, the encrypted data is transferred from the user's computer 602 to the token (100) preferably by means of an optical channel, or alternatively by means of the keypad on the token (100). Once the encrypted transaction data is received by the token (100), the device decrypts the data using the Data Transport Key (DTK) derived in Step 620. Finally, the token (100) shows the clear text transaction data on its display for verification by the user.

Step 650 consists of the generation and verification of the electronic signature over the transaction data. In this step, the user verifies whether the transaction data displayed by the token (100) match the transaction data submitted by the user to the server 603 in Step 630. If the user approves the displayed transaction data, the token (100) computes an electronic signature over the transaction data using the Transaction Signing Key (TSK). The user then manually copies the electronic signature onto the user's computer 602 and submits it to the Authentication Server 603 for verification.

Server Initiated Mutual Authentication

This section discusses in more detail the mutual authentication process between the Authentication Server (and Business Unit) and the token (100).

Authentication of Authentication Server (and Business Unit) to Token

Figure 7:
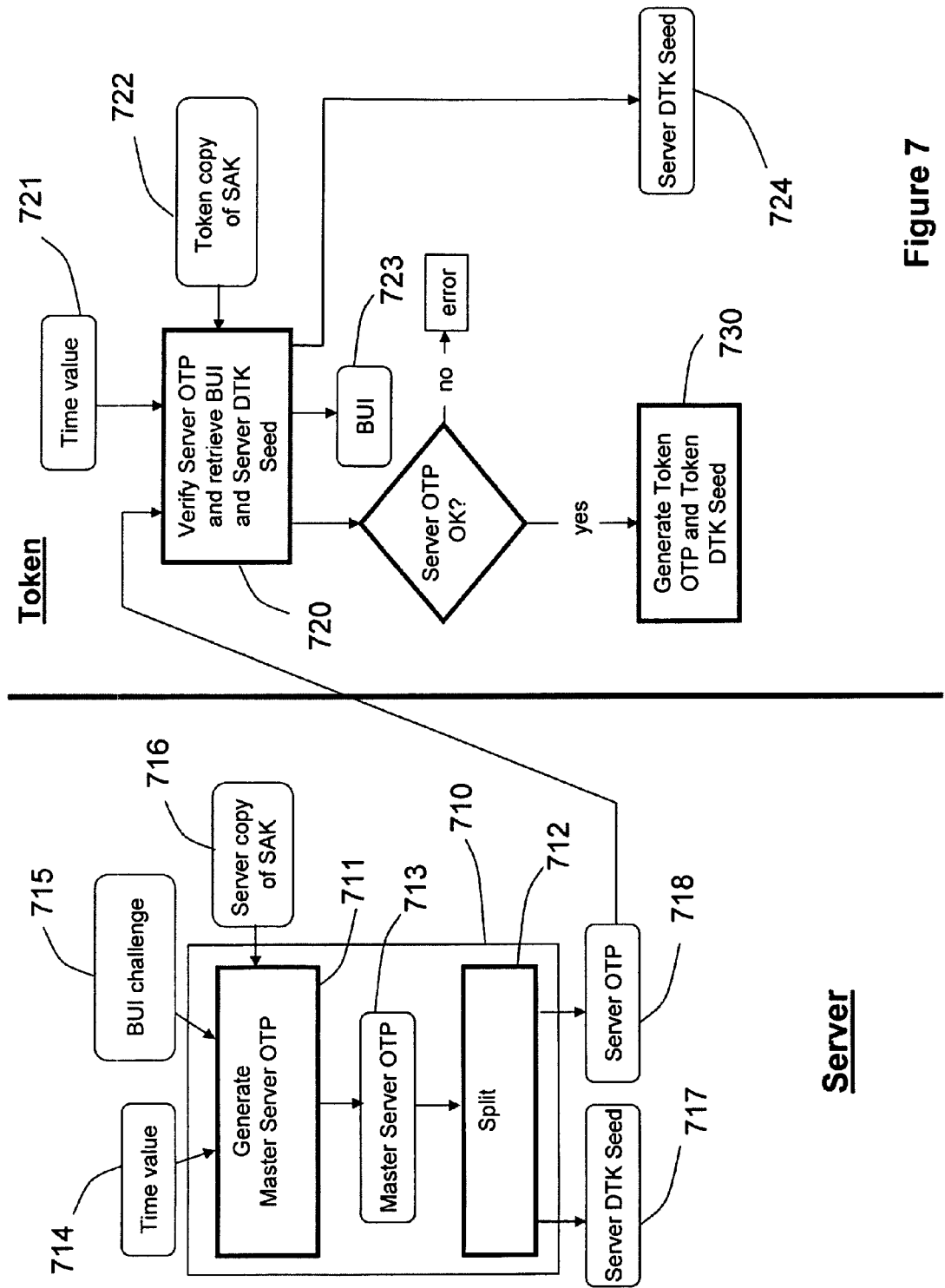
FIG. 7 illustrates the different steps in authenticating a server to a token prior to the token's generating a one-time password.

This is illustrated in FIG. 7.

Step 1: Generation (710) of the Server OTP (718) by the Authentication Server First, the Authentication Server generates the Master Server OTP (713). The Master Server OTP (713) is a time- and challenge-based one-time password, computed using the following input:
1. Key, being the Server Authentication Key (SAK) (716)
2. a dynamic variable, being Time (714)
3. Challenge, being a Business Unit Index (BUI) (715). The BUI (715) is defined as a non-secret number which uniquely identifies the Business Unit that has to be authenticated.

The master server OTP (713) has the following properties:
It has a small time step. The small time step ensures that the value of the OTP changes quickly enough, so that two subsequent sessions have a different Master Server OTP.
It has a number of time synchronization digits. The time synchronization digits allow a smooth verification of the OTP by the token (100) even if the token (100) has not been used for a long time. The time synchronization digits are scrambled with the other digits of the OTP so that they are not apparent to the user.

Next, the Master Server OTP (713), which has a length of 16 digits, is split (712) into two parts:
1. The 8-digit Server OTP (718), which includes the time synchronization digits, is the server credential that will be used to authenticate the Authentication Server to the token (100).
2. The 8-digit Server DTK Seed (717), which does not include any time synchronization digits, is kept secret by the Authentication Server. It will be used to derive the Data Transport Key (DTK).

Step 2: Transmission of Server OTP (718) from the Authentication Server to Token Subsequently, the 8-digit Server OTP (718) is sent to the token (100) using one of two channels.
1. Optical transmission of Server OTP (718). This is the preferred channel since it is most user-friendly.
2. Manual entry of Server OTP (718) via the token's keypad.
Note that we can take the number entered via the keypad as short as the original 8 digits. In that case the token (100) should deduct the optical command from the length of digits entered.

Step 3: Verification (720) of Server OP (718) by Token

When the token (100) receives the Server OTP (718), it will verify (720) the Server OTP (718) using its copy of the SAK (722) as follows:
1. Recovery of the time synchronization digits from the OTP. These digits help the token (100) to know at which moment in time the Server OTP (718) was generated. Note that the time difference accepted by the token (100) depends on how long the token (100) was not used. It can be short if the token (100) was used some days ago, but it can be more relaxed if the token (100) was not used for months or years.
2. Identification of challenge by exhaustive search: The token (100) performs an exhaustive search of the Business Unit Index (BUI) values (limited to maximum 4 different values) in order to find a BUI (723) that gives rise to an OTP that matches the Server OTP (718).

A Server OTP (718) is correct if:
It was generated with the same SAK (716) as the SAK (722) that is stored in the token (100), and it was generated using a Business Unit Index (BUI) (715) that is known to token (100), and it was generated inside the time acceptance window that is used by token (100), and it is not older than the last received correct Server OTP.

A particular case is the case in which a Server OTP value is entered in the token (100) that is EQUAL to the last Server OTP that was previously entered. This particular case can arise if a user failed to copy the Token OTP the first time (e.g. because the token (100) switched off automatically before the user had the time to copy the Token OTP value), and attempts to re-generate the Token OTP by entering again the same challenge.

This can be handled without introducing a security vulnerability as follows:

The token (100) verifies that the time elapsed since the first entry is small enough.

The token (100) regenerates exactly the same Token OTP as was generated for the first entry.

The verification has two possible outcomes:

1. Failure. In this case, an error message is shown to the user and the token (100) refuses to generate a Token OTP. This prevents a rogue server from getting a Token OTP without involving the genuine Authentication Server.
2. Success. In this case the token (100) has successfully authenticated the Authentication Server and determined the Business Unit (723). As a side effect, the token (100) also generates the Server DTK Seed (724) of the 16-digit Master Server OTP (713).

Authentication of the Token to the Authentication Server

Figure 8:
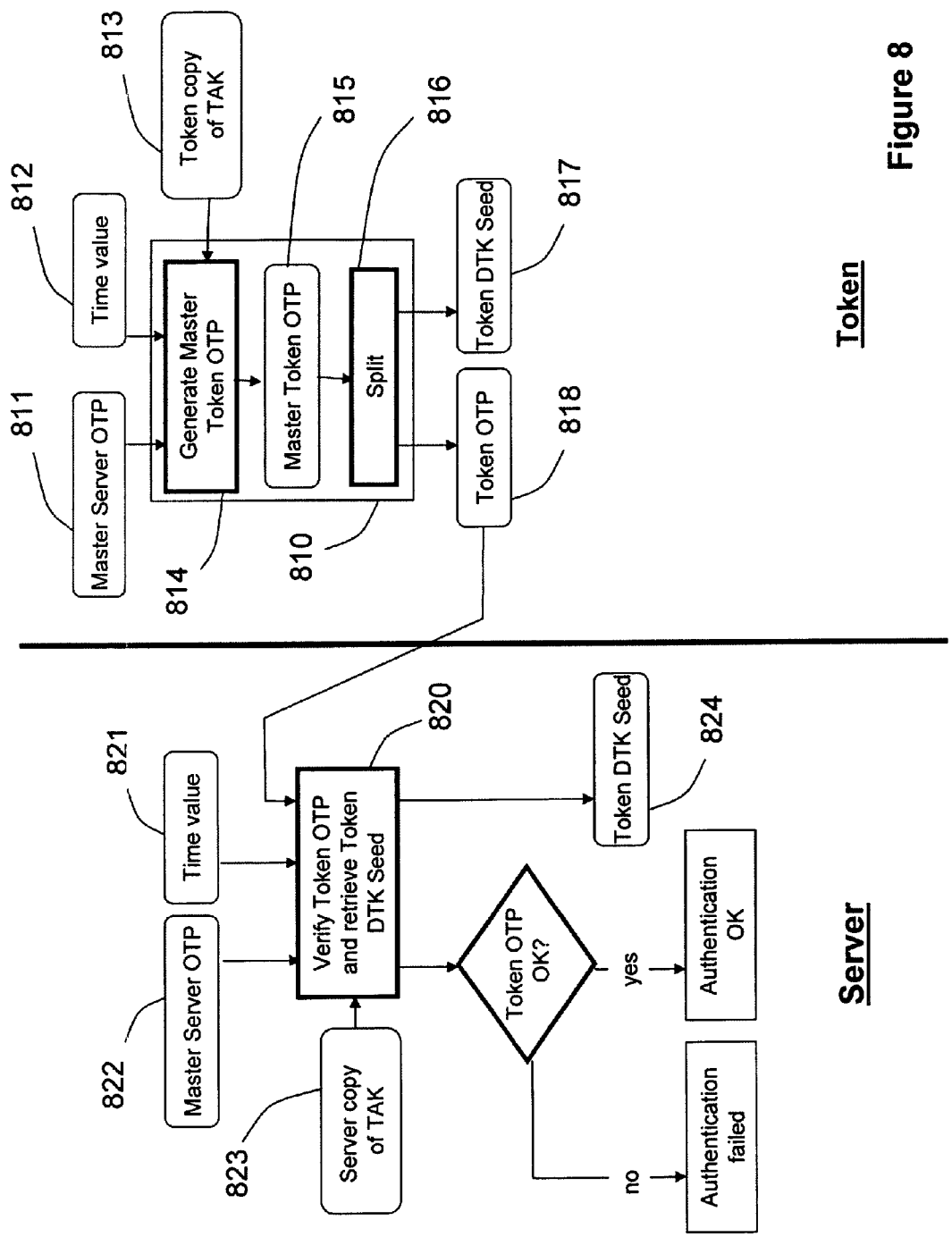
FIG. 8 illustrates the different steps in the generation of a one-time password by the token after successful authentication of the server.

This is illustrated in FIG. 8.

Step 1: Generation (810) of Token OTP (818) by the Token

First, the token (100) generates (814) the Master Token OTP (815). The Master Token OTP (815) is a time- and challenge-based one-time password, computed using following input:

1. Key, being the Token Authentication Key (TAK) (813)
2. a dynamic variable, being the Time (812)
3. Challenge, being the 16-digit Master Server OTP (811).

Next, the Master Token OTP (815), which has a length of 20 digits, is split (816) into two parts:

1. The 6-digit Token OTP (818), which will be used to authenticate the token (100) to the Authentication Server.
2. The 14-digit Token DTK Seed (817) is kept secret by the token (100). It will be used to derive the Data Transport Key (DTK).

Step 2: Transmission of the Token OTP from the Token to the Authentication Server The token (100) visualizes the Token OTP together with a Business Unit identifier in order to inform the user that he is connected to the correct Business Unit.

The user can new type over the 6-digit Token OTP (818) onto his PC, which will transfer the Token OTP (818) to the Authentication Server.

Step 3: Verification of the Token OTP by the Authentication Server

The Authentication Server verifies (820) the Token OTP (818) using its time (821) and its copies of the TAK (823) and the Master Server OTP (822). The verification (820) has two possible outcomes:

Failure. The user has not been successfully authenticated and no Token DTK Seed and hence no DTK can be generated by the Authentication Server.

Success. The user has been authenticated to the Authentication Server. As a side effect, the Authentication Server will generate the Token DTK Seed (824) of the Master Token OTP.

Memorizing the Common Secret Bits for the Data Transport Key (DTK)

Figure 9:
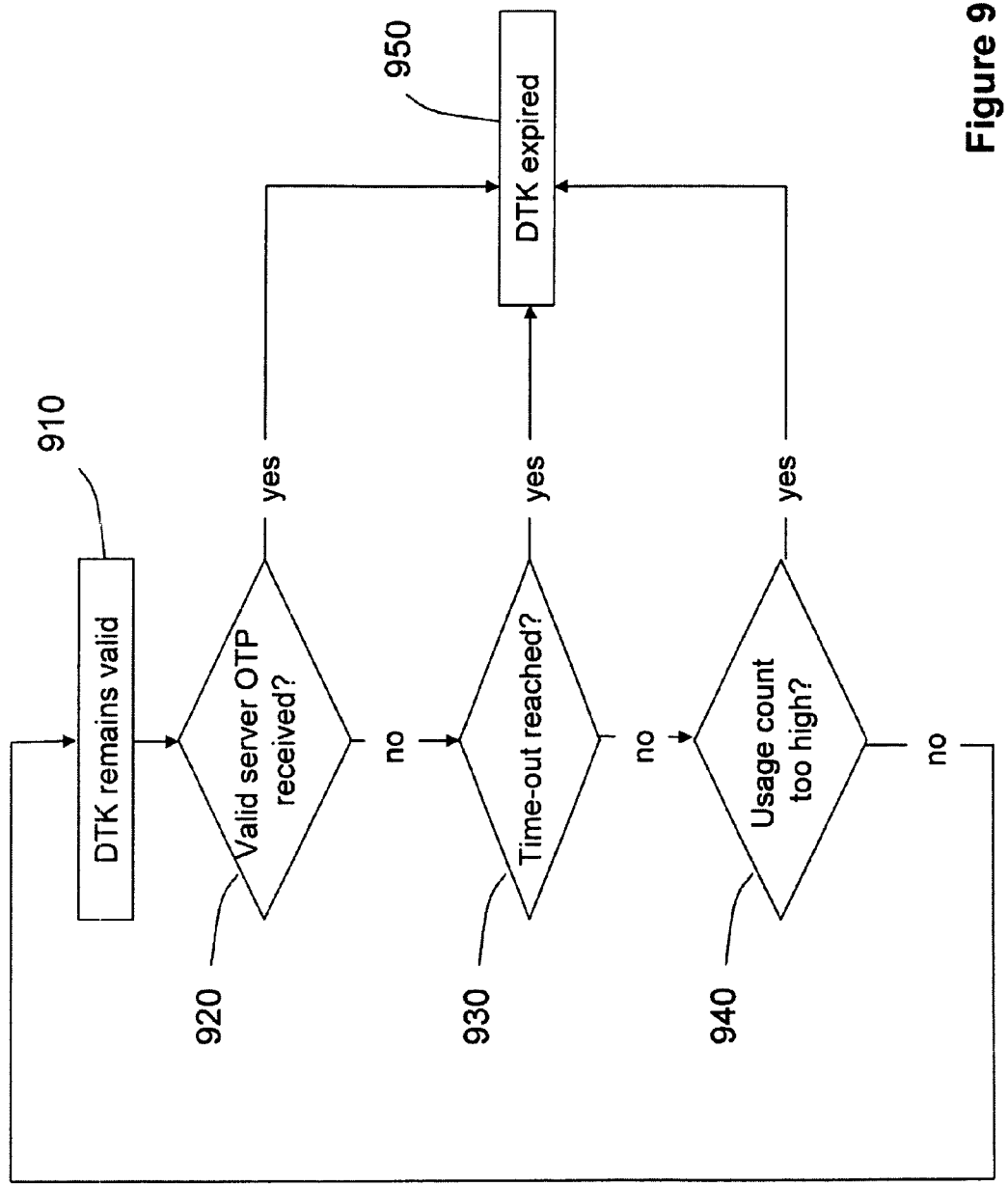
FIG. 9 illustrates the process of determining the end of the validity of a Data Transport Key.

After a successful mutual authentication, the user could switch off his token (100) while being on-line with the on-line banking application or the token (100) can switch off automatically after some time of inactivity to save the battery. After some time, the user might decide to do a transaction that needs to be signed. At that moment the user can switch on the token (100) again, and enter the transaction data, encrypted with the Data Transport Key (DTK), into the token (100). To enable this possibility, the token (100) memorizes the last value of the Data Transport Key even when the token (100) is switched off. For security reasons the token (100) will memorise the Data Transport Key only during a certain validity period. As illustrated in FIG. 9, The DTK remains valid (910) and is memorised by the token (100) until one of following events happens:

A valid Server OTP is received (920) that is different from the Server OTP that was used to generate the current DTK value.

A timeout is reached (930); The token (100) uses two timeouts limiting the validity period of the DTK value. A first timeout refers to the time of the last authentication or signature. A second timeout refers to the time the current DTK value was generated. These timeouts should be equal to or larger than the similar timeout programmed at the server side.

Optionally, a certain maximum usage count is exceeded (940). The counter may for example be related to the number of times the DTK has been used or the number of times a signature has been generated.

Server Initiated Signature

The Server Initiated Signature function allows the user to generate an electronic signature over a financial transaction.

Submission of Transaction Data by User to Authentication Server

At the beginning of the transaction signature process, the user sends the clear text financial transaction data to the Authentication Server. One way that the transaction can be submitted to the Authentication Server is by the user entering the transaction data on the user's computer after which the user's computer sends the transaction data over the internet to the Authentication Server.

Generation of Signature Initiating Message by Authentication Server

Figure 10:
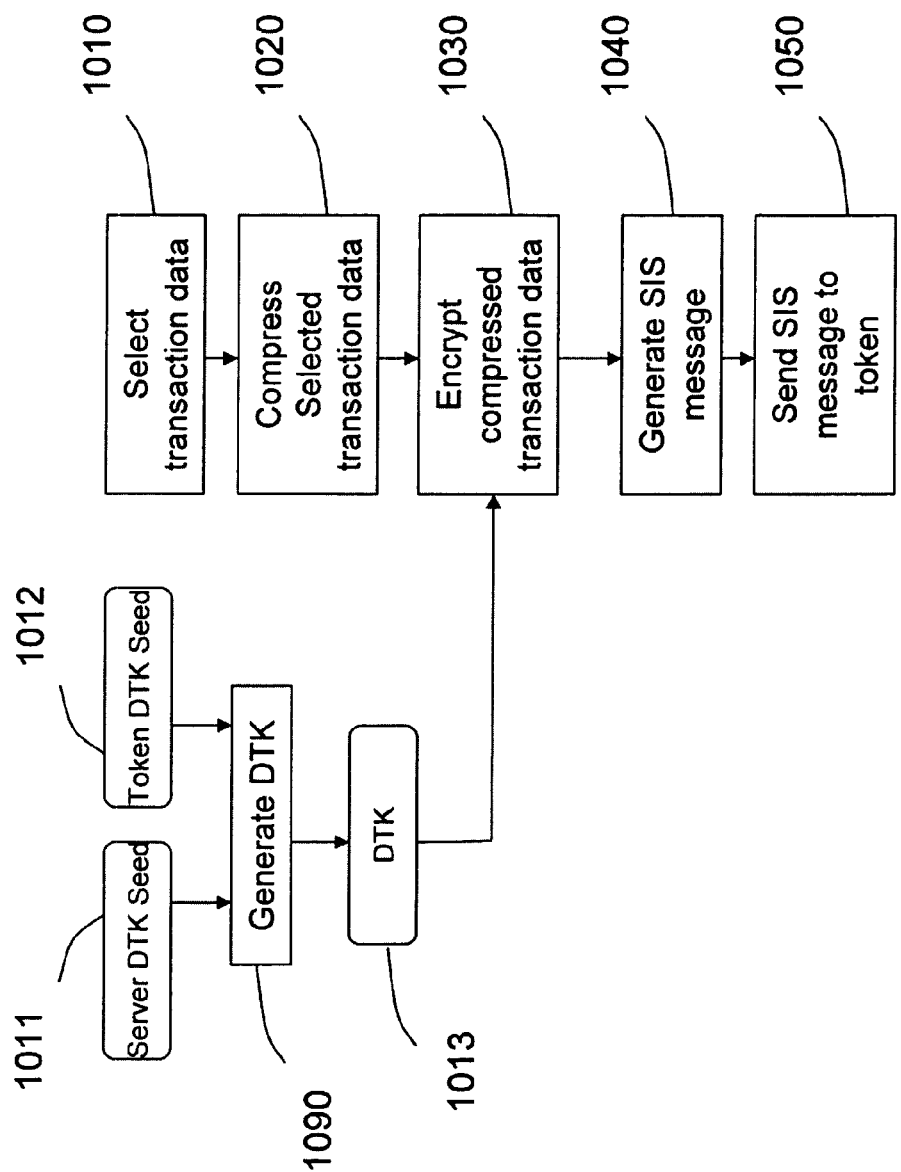
FIG. 10 illustrates the generation of a signature initiating message by a server.

This is illustrated in FIG. 10.

Step 1: Compression of Transaction Data

First, the Authentication Server selects (1010) the fields of the transaction data that have to be electronically signed by the user. This selection can be based on the risk level associated with the respective transaction fields.

Thereafter, the Authentication Server compresses (1020) the selected transaction data using various data representation and compression methods including the following:

1. The decimal digits '0' to '9' are represented using 4-bit codes e.g. using, the well known Binary Coded Decimal (BCD) coding.
2. Frequently used transaction fields are represented by dedicated 8-bit shortcuts or tag values.
3. Frequently used messages or message parts are represented by dedicated 8-bit shortcuts or tag values.
4. Only a limited set of alphanumeric characters (for example letters, symbols and punctuation) is supported. Other characters are mapped onto a supported character. Supported alphanumeric characters are represented by 8-bit values, which may for example be in the 0xA0 to 0xFF range of hexadecimal values.

Step 2: Encryption of Compressed Transaction Data

Subsequently, the compressed transaction data are encrypted (1030). The goals of the encryption are:

Protection of the authenticity of the transaction data: the token (100) is able to verify whether the transaction data originate indeed from the genuine Authentication Server, rather than from a rogue server. As a result, a rogue server cannot trick the token (100) into electronically signing a transaction that was chosen by this rogue server.

Protection of the integrity of the transaction data: the token (100) is able to verify whether the transaction data has not been altered in transit.

Protection of the confidentiality of the transaction data.

The cryptographic key that is used to encrypt the transaction data is called the Data Transport Key (DTK) (1013). This key has following properties:

The Data Transport Key (1013) is generated using the Master Server OTP and Master Token OTP which were computed during the mutual authentication process.

The Data Transport Key (1013) is a 3DES key with a length of 128 bits.

Because the Data Transport Key (1013) is computed (1090) using the Server DTK Seed (1011) and Token DTK Seed (1012), the key is session- and token-dependent.

The encryption process is the following:
1. Firstly, a 1-byte block of redundant data is concatenated to the formatted transaction data.
2. Secondly, the data from (1) is encrypted (1030) using the 3DES algorithm in CBC-mode with Ciphertext Stealing (CTS) and the Data Transport Key (DTK) (1013) as key. This mode allows encrypting data that is not a multiple of 8 bytes and does not cause message expansion (i.e. the cipher text has the same length as the clear text transaction data).

Integrity of the transaction data is guaranteed through the use of the 1-byte redundancy block and the OBC-mode encryption.

Step 3: Submission of Encrypted Data to Token

Finally, the encrypted string is combined (1040) with the "SIGN" command and converted into two formats:
1. A flashing pattern format including ORC and timing information.
2. A decimal number back-up format including visual formatting and check-digit.

Both formats can be presented to the token (1050).

Generation of electronic signature by token (100)

Figure 11:
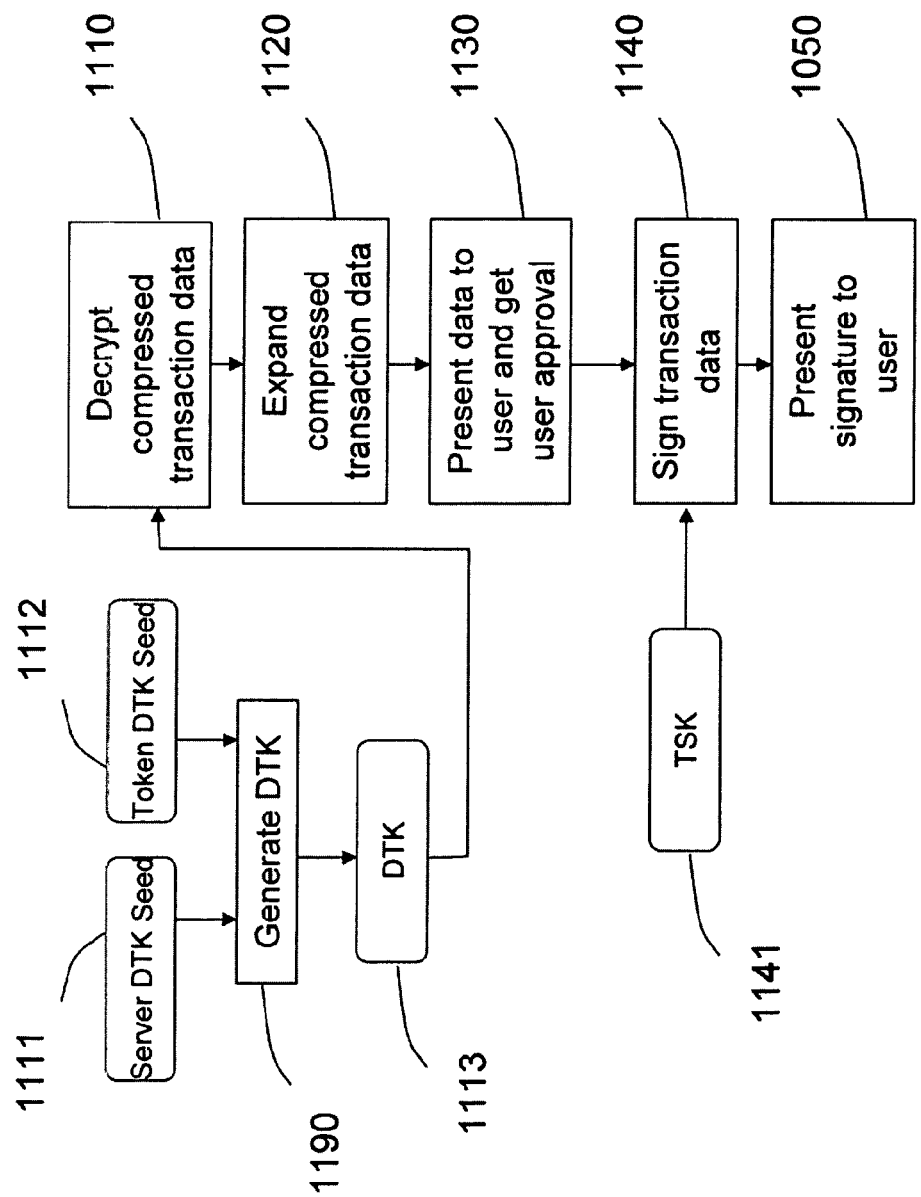
FIG. 11 illustrates the verification by a token of a signature initiating message and the subsequent generation of a signature.

This is illustrated in FIG. 11.

Step 1: Decryption of Encrypted Transaction Data

First, the user enters the encrypted transaction data entered into the device using the optical channel or the keypad of the token (100). After the entry process, the data and command is recovered. After this recovery, there is no difference anymore between optical and keypad entered data. The "SIGN" command instructs the token (100) that it should execute the signature flowchart.

In order to decrypt (1110) the encrypted transaction data, the token (100) calculates (1190) the Data Transport Key (DTK) (1113). This happens in exactly the same way as the Authentication Server did.

The token (100) decrypts (1110) the received data and checks the integrity. An attacker, wanting to inject false messages (without having the DTK) is disturbed by:

The fact that changing one bit of the ciphertext changes minimum 8 bytes of the clear text.

The compression/decompression algorithm that makes controlled manipulations more difficult.

An extra 8 bit integrity check mainly intended to avoid sabotage attacks.

Step 2: Expansion of the Transaction Data

The token (100) expands (1120) the decrypted compressed transaction data a first time (called the visual expansion) in order to get the message that needs to be shown to the user. This message is shown to the user on the token (100) display, and the user should approve (or refuse) the message (1130).

Step 3: Generation of Electronic Signature Over Transaction Data

After approval by the user, the token (100) expands the decrypted compressed transaction data a second time (called the signature expansion) in order to get the message that needs to be cryptographically signed. The result of this second expansion can be different from the result of the previous expansion because:

abbreviations can be replaced with original text, messages can be shown in the local language of the user, small unintended differences can exist as 'blanks' or other format related data.

The transaction data is signed (1140) using the Transaction Signing Key (TSK) (1141). The signing algorithm is an ANSI X9.9 or X9.19 variant, also including time information. The result is an Electronic Signature Code, typically consisting of a string of 8 decimal digits.

Finally, the Electronic Signature Code is shown (1050) to the user on the token (100) display so that the user can submit this Electronic Signature Code to the Authentication Server for verification.

Communication Protocol Stack

Physical Layer

At the physical layer, data is transported between a computer and the token (100) by light variations. The light is emitted by the computer screen by means of a varying pattern and received by the token (100) by means of its 5 phototransistors. Therefore 5 flashing screen areas should be positioned in front of 5 phototransistors.

One of the problems to be solved in an actual implementation of these flashing patterns on the user's computer screen is the great variety in sizes and resolutions of existing users' computer screens. In one embodiment of the invention this problem is overcome by combining the flashing patterns with a slider-bar that allows adjusting the flashing patterns dimensions. The user should adjust the dimensions using this slider-bar until the flashing patterns fit the physical positions of the corresponding phototransistors on the token (100). To help the user the token (100) plastic is marked with 3 triangular signs that should fit similar signs associated with the flashing patterns on the user's computer screen. To avoid that a user has to adjust the flashing patterns' dimensions at each logon, it is advised that the application remembers the correct settings of the slider bar for the user's computer screen for the next log-on. This can for example be done by storing the adjusted dimension settings in a cookie.

There are four data channels and one clock channel. The clock channel is used in defining the transmission speed or transmission moments and in defining the transmission levels. Every time the clock channel changes (or toggles), a new bit is represented by the data channels. The toggle rate can be variable (in order to handle delays in the screen display), but within certain limits. The data channels use three intensity levels. The clock channel will only use the two higher intensity levels. The lowest level is defined in reference to the middle level. For best results, as stable as possible a clock change rate and as distinct as possible light levels are to be used. The data channels are used to transmit a "word" consisting of 4 ternary digits. A complete message consisting of N ternary words, is sent serially starting with the first word up to the last word.

Data Link Layer

A data link frame consists of special start-of-frame ternary word, a pay load, and a special end-of-frame ternary word. The Data link payload contains a message data field, a 4-bit command ID, a CRC-12 calculated over the previous two fields, and zero padding to bring payload size up to multiple of 6 bits. The complete bit sequence of the payload is divided in blocks of 6 bits and this 6-bit binary value is transmitted by its 4-digit ternary equivalent.

Multi Message Transmission:

An application layer message may be split-up over a number of data link frames that are concatenated and sent one after the other. The full group of data link frames can then be transmitted in a circular way so that the messages are repeated all the time. The user will typically present the token (100) at an arbitrary moment. The token (100) starts reading after the start-of-frame word and then captures all data link frames one by one, until the end-of-frame word is received. Consecutive data link frames are separated by special separator ternary words. The ternary word values of the special start-of-frame, end-of-frame, and separator ternary words are chosen among the ternary word values that are not used to encode blocks of 6 data bits. If all data link frames have been received, the user is informed that the data input has been completed.

Transport+Application Layer

In order to achieve higher over-all efficiency, the transport layer uses "application" properties. The token (100) has 3 applications for the optical transmission:

1. Transmission of the challenge for the mutual authentication: The massage data block is equal to the BCD encoding of a challenge with an optional 0xd nibble in case an odd amount of digits was presented.
2. Transmission of the encrypted fields for signature: If the payload is relatively small, it can be transmitted in a single optical data link frame. If the payload is relatively large, it has to be split over 2 or 3 or 4 data link frames in blocks of more or less equal length.
3. Transmission of optical TEST commands: Test commands are used to test the optical interface. Their content is displayed on the display of token (100).

Keypad Back-Up

In case the optical communication does not work properly, a keypad back-up is foreseen consisting of manual entry via the token's keypad.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. An apparatus for generating and communicating to a user security values for use in interactions with a server, said apparatus comprising:
   a data input interface for receiving a server message comprising transaction related data and server credential information cryptographically related to the transaction related data,
   a user communication interface to communicate information to a user and to receive input from the user, the communication interface adapted to present a representation of the transaction related data to the user for approval and to detect the user's approval of the transaction related data,
   one or more microprocessors for performing a verification of said server credential information, and for generating a security value, said generation of said security value being performed using a first symmetric cryptographic algorithm with a first secret shared between said apparatus and said server, and said verification of said server credential information being performed using a second symmetric cryptographic algorithm with a second secret shared between said apparatus and said server;
   wherein the user communication interface is further adapted to communicate said generated security value to the user; and
   wherein the generation and communication of the security value to the user is conditional on said server credential information verification and said user's approval of the transaction related data.

2. The apparatus of claim 1, wherein said security value and said server credential information have a size of less than 64 bits.

3. The apparatus of claim 1, wherein said verification of said server credential information uses at least one dynamic value.

4. The apparatus of claim 3, further comprising a clock, wherein said at least one dynamic value includes a time value provided by said clock.

5. The apparatus of claim 3, wherein said generating of the security value involves data related to said server credential information.

6. The apparatus of claim 5, wherein said transaction related data includes at least one value and at least context information related to a transaction to be approved by a user, and said user communication interface to communicate information is adapted to communicate said at least one value and at least context information related to a transaction to said user.

7. The apparatus of claim 6, wherein said at least one value and at least context information are formatted using a compact encoding scheme.

8. The apparatus of claim 7, further comprising a memory storing data constants, wherein said compact encoding scheme includes the usage of references to said data constants.

9. The apparatus of claim 7, wherein said at least one value and at least context information formatted using a compact encoding scheme are expanded prior to being used in said generating of the security value.

10. The apparatus of claim 6, wherein said server credential information comprises at least a cryptogram generated to authenticate the source of said server credential information using a symmetric algorithm and at least part of said at least one value and at least context information and a key shared between said apparatus and said server.

11. The apparatus of claim 10, wherein the lifetime of said key is limited.

12. The apparatus of claim 11, wherein said lifetime is limited by a time-out value.

13. The apparatus of claim 11, wherein said lifetime is limited by a counter value.

14. The apparatus of claim 11, wherein said lifetime is limited by an event.

15. The apparatus of claim 10, wherein said key is generated by said apparatus using data related to the generating of a security value.

16. The apparatus of claim 10, wherein said key is generated by said apparatus using data related to the verification of server credential information.

17. The apparatus of claim 10, wherein said at least one value and at least context information is encrypted by said server and decrypted by said apparatus using a symmetric cryptographic algorithm and said key.

18. The apparatus of claim 1, further adapted to execute a remote management instruction included in said server message conditional on said verification.

19. The apparatus of any of claims 1 to 5, wherein said data input interface comprises one or more buttons or keys.

20. The apparatus of any of claims 1 to 5, wherein said data input interface comprises a plurality of photosensitive elements.

21. The apparatus of any of claim 1 or 6, wherein said generating of security value includes the use of a counter value.

22. The apparatus of any of claim 1 or 6, further comprising a clock, wherein said generating of the security value includes the use of a time value.

23. The apparatus of any of claim 1 or 6, wherein said generating of the security value includes the use of a challenge.

24. The apparatus of claim 1, wherein the communication interface is not removable from the apparatus.

25. The apparatus of claim 24, wherein the communication interface is fully controlled by the apparatus.

26. The apparatus of claim 1 wherein said security value comprises an electronic signature on said transaction related data.

27. The apparatus of claim 1 wherein said transaction related data are compressed and wherein the apparatus is further adapted to expand said compressed transaction related data prior to said presentation of a representation of said transaction related data to the user for approval.

28. The apparatus of claim 27 wherein the compressed transaction related data comprises one or more references to text or values known to or stored in the apparatus.

29. The apparatus of claim 28 wherein the compressed transaction related data comprises non-formatted numerical data and wherein the apparatus is further adapted to expand said non-formatted numerical data by adding formatting to said non-formatted numerical data.

30. The apparatus of claim 28 wherein the compressed transaction related data comprises one or more tagged data structures and whereby the apparatus is further adapted to expand said tagged data structures based on the value of a tag of the tagged data structure.

31. An apparatus for producing and communicating to a user security values for use in interactions with a server, said apparatus comprising:
a first security device including a first microprocessor; and
a second removable security device including a second microprocessor configured to interface with the first microprocessor;
the first security device further including:
a data input interface for receiving a server message comprising transaction related data and server credential information cryptographically related to the transaction related data,
a user communication interface to communicate information to a user and to receive input from the user, the communication interface adapted to present a representation of the transaction related data to the user for approval and to detect the user's approval of the transaction related data, and
an interface coupled to the first microprocessor for communication between the first microprocessor and the second microprocessor of the removable security device in order to generate a security value and to perform verification of said server credential information using the first and the second microprocessor, said generating of said security value being performed using a first symmetric cryptographic algorithm with a first secret shared between said removable security device and said server and said verification of said server credential information being performed using a second symmetric cryptographic algorithm with a second secret shared between said removable security device or said apparatus and said server;
wherein the user communication interface is further adapted to communicate said generated security value to the user; and
wherein the generation and communication of the generated security value to the user is conditional on said server credential information verification and said user's approval of the transaction related data.

32. The apparatus of claim 31, further adapted to signal the occurrence of an unsuccessful verification of said server credential information to said user.

33. The apparatus of claim 31, wherein said security value and said server credential information have a size of less than 64 bits.

34. The apparatus of claim 31, wherein said verification of said server credential information uses at least one dynamic value.

35. The apparatus of claim 34, further comprising a clock, wherein said at least one dynamic value includes a time value provided by said clock.

36. The apparatus of claim 34, wherein said generating of the security value involves data related to said server credential information.

37. The apparatus of claim 36, wherein said transaction related data includes at least one value and at least context information related to a transaction to be approved by a user, and said user communication interface is adapted to communicate said at least one value and at least context information related to a transaction to said user.

38. The apparatus of claim 37, wherein said at least one value and at least context information are formatted using a compact encoding scheme.

39. The apparatus of claim 38, further comprising a memory storing data constants, wherein said compact encoding scheme includes the usage of references to said data constants.

40. The apparatus of claim 38, wherein said at least one value and at least context information formatted using a compact encoding scheme are expanded prior to being used in said generating of the security value.

41. The apparatus of claim 37, wherein said server credential information comprises at least a part of a cryptogram generated to authenticate the source of said server credential information using a symmetric algorithm and at least part of said at least one value and at least context information and a key shared between said apparatus or said removable security device and said server.

42. The apparatus of claim 41, wherein the lifetime of said key is limited.

43. The apparatus of claim 42, wherein said lifetime is limited by a time-out value.

44. The apparatus of claim 42, wherein said lifetime is limited by a counter value.

45. The apparatus of claim 42, wherein said lifetime is limited by an event.

46. The apparatus of claim 41, further adapted to verify said at least a part of a cryptogram using said key.

47. The apparatus of claim 41 or claim 46, wherein said key is generated using data related to the generating of a security value.

48. The apparatus of claim 41 or claim 46, wherein said key is generated using data related to the verification of server credential information.

49. The apparatus of claim 41, wherein said at least one value and at least context information is encrypted by said server and decrypted by said apparatus using a symmetric cryptographic algorithm and said key.

50. The apparatus of claim 31, wherein said removable security device is a smart card.

51. The apparatus of claim 50, wherein said removable security device verifies said server credential information.

52. The apparatus of claim 50, said second secret being shared between said apparatus and said server, and to instruct said removable security device to generate a cryptogram using a dynamic value and said first secret, and to receive from said removable security device said cryptogram, and to produce said security value using said received cryptogram.

53. The apparatus of claim 52, wherein said transaction related data includes at least one value and at least context information related to a transaction to be approved by a user, and said user communication interface is adapted to communicate said at least one value and at least context information related to a transaction to said user, and wherein said apparatus is adapted to generate a signature key using said cryptogram received from said removable security device and to generate said security value using said signature key and said at least one value and at least context information.

54. The apparatus of claim 52, further adapted to generate said second secret using data received from said removable security device.

55. The apparatus of claim 31, wherein the communication interface is not removable from the apparatus.

56. The apparatus of claim 55, wherein the communication interface is fully controlled by the apparatus.

57. The apparatus of claim 31, further adapted to execute a remote management instruction included in said server message conditional on said verification.

58. The apparatus of any of claims 31 to 36, wherein said data input interface comprises one or more buttons or keys.

59. The apparatus of any of claims 31 to 36, wherein said data input interface comprises a plurality of photosensitive elements.

60. The apparatus of any of claim 31 or 37, wherein said generating of security value includes the use of a counter value.

61. The apparatus of any of claim 31 or 37, further comprising a clock, wherein said generating of the security value includes the use of a time value.

62. The apparatus of any of claim 31 or 37, wherein said generating of the security value includes the use of a challenge.

63. The apparatus of claim 31 wherein said security value comprises an electronic signature on said transaction related data.

64. The apparatus of claim 31 wherein said transaction related data are compressed and wherein the apparatus is further adapted to expand said compressed transaction related data prior to said presentation of a representation of said transaction related data to the user for approval.

65. The apparatus of claim 64 wherein the compressed transaction related data comprises one or more references to text or values known to or stored in the apparatus.

66. The apparatus of claim 65 wherein the compressed transaction related data comprises non-formatted numerical data and wherein the apparatus is further adapted to expand said non-formatted numerical data by adding formatting to said non-formatted numerical data.

67. The apparatus of claim 65 wherein the compressed transaction related data comprises one or more tagged data structures and whereby the apparatus is further adapted to expand said tagged data structures based on the value of a tag of the tagged data structure.

* * * * *